(12) United States Patent  (10) Patent No.: US 11,363,499 B2
Li et al.  (45) Date of Patent: Jun. 14, 2022

(54) RESOURCE CONFIGURATION METHOD, APPARATUS, AND SYSTEM

(71) Applicant: HUAWEI TECHNOLOGIES CO., LTD., Guangdong (CN)

(72) Inventors: Junchao Li, Shanghai (CN); Hao Tang, Shanghai (CN); Zhenfei Tang, Ottawa (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 193 days.

(21) Appl. No.: 16/713,924

(22) Filed: Dec. 13, 2019

(65) Prior Publication Data

US 2020/0120545 A1   Apr. 16, 2020

Related U.S. Application Data

(63) Continuation of application No. PCT/CN2018/112941, filed on Oct. 31, 2018.

(30) Foreign Application Priority Data

Nov. 17, 2017 (CN) .......................... 201711148101.3

(51) Int. Cl.
*H04W 4/00* (2018.01)
*H04W 28/26* (2009.01)
(Continued)

(52) U.S. Cl.
CPC ........... *H04W 28/26* (2013.01); *H04L 5/0051* (2013.01); *H04L 5/0053* (2013.01); *H04W 72/044* (2013.01)

(58) Field of Classification Search
None
See application file for complete search history.

(56) References Cited

U.S. PATENT DOCUMENTS

2009/0257388 A1  10/2009  Khandekar et al.
2012/0115463 A1* 5/2012  Weng ................... H04B 17/318
                                                            455/425

(Continued)

FOREIGN PATENT DOCUMENTS

CN  101064577 A  10/2007
CN  101119277 A  2/2008
(Continued)

OTHER PUBLICATIONS

Huawei et al: "Overview of reserved resources",3GPP Draft; R1-1713735,Aug. 20, 2017 (Aug. 20, 2017), XP051316534,total 4 pages.

(Continued)

*Primary Examiner* — Phirin Sam
(74) *Attorney, Agent, or Firm* — Womble Bond Dickinson (US) LLP

(57) ABSTRACT

A resource configuration method, an apparatus, and a system are disclosed. The method includes: determining a reserved resource element (RE) in a resource unit, where the reserved RE is included in a reserved resource; and transmitting data on all or some REs other than the reserved resource. The resource unit includes X resource blocks (RBs) in frequency domain and includes Y symbols in time domain, where X and Y are positive integers. According to the resource configuration method provided in the present disclosure, a data conflict between different terminals during data transmission can be reduced, and resource utilization can be improved.

19 Claims, 13 Drawing Sheets

(51) Int. Cl.
  *H04L 5/00* (2006.01)
  *H04W 72/04* (2009.01)

(56) References Cited

U.S. PATENT DOCUMENTS

| | | |
|---|---|---|
| 2015/0003346 A1 | 1/2015 | Kim et al. |
| 2016/0150527 A1 | 5/2016 | Yang et al. |
| 2016/0255519 A1* | 9/2016 | Cheng .................. H04J 11/0056 370/329 |
| 2016/0302175 A1* | 10/2016 | Blankenship ........... H04W 4/70 |
| 2017/0126300 A1 | 5/2017 | Park et al. |
| 2017/0230970 A1 | 8/2017 | Kim et al. |
| 2019/0028248 A1* | 1/2019 | Baldemair ............ H04L 5/0023 |
| 2020/0229165 A1* | 7/2020 | Blankenship ......... H04L 5/0096 |

FOREIGN PATENT DOCUMENTS

| | | |
|---|---|---|
| CN | 102340394 A | 2/2012 |
| CN | 104168610 A | 11/2014 |
| CN | 105611544 A | 5/2016 |
| CN | 105827365 A | 8/2016 |
| CN | 106664706 A | 5/2017 |
| CN | 104067548 B | 11/2018 |
| EP | 1855424 A1 | 11/2007 |
| WO | 2013036090 A1 | 3/2013 |
| WO | 2016192598 A1 | 12/2016 |
| WO | 2017123129 A1 | 7/2017 |

OTHER PUBLICATIONS

Samsung,"Guard band Considering Inter-Numerology Interference",3GPP TSG RAN WG1 Meeting #87,R1-1612445, Reno, USA Nov. 14-18, 2016, total 7 pages.
Intel Corporation: "On resource reservation for forward compatibility",3GPP Draft; R1-1714084,Aug. 20, 2017 (Aug. 20, 2017),XP051316874,total 4 pages.
MCC Support,"Final Report of 3GPP TSG RAN WG1 #88 v1 0.0",3GPP TSG RAN WG1 Meeting #88bis,R1-1704172, Spokane, USA, Apr. 3-7, 2017, total 153 pages.
Samsung: "Numerology for URLLC",3GPP Draft; R1-1609050,Oct. 9, 2016 (Oct. 9, 2016), XP051149102,total 4 pages.
3GPP TS 38.211 V0.2.1 (Aug. 2017),3rd Generation Partnership Project;Technical Specification Group Radio Access Network;NR;Physical channels and modulation(Release 15), total 40 pages.
Huawei et al: "Discussion on resource allocation and indication for data channel",3GPP Draft; R1-1701662,Feb. 12, 2017 (Feb. 12, 2017), XP051208829,,total 4 pages.
Huawei et al:"Remaining issues on reserved resourcesand rate-matching",3GPP Draft; R1-1719382,Nov. 18, 2017 (Mov. 18, 2017),Nov. 18, 2017 (Nov. 18, 2017),total 8 pages.

* cited by examiner

RESOURCE CONFIGURATION METHOD, APPARATUS, AND SYSTEM

CROSS-REFERENCE TO RELATED APPLICATIONS

This application is a continuation of International Application No. PCT/CN2018/112941, filed on Oct. 31, 2018, which claims priority to Chinese Patent Application No. 201711148101.3, filed on Nov. 17, 2017. The disclosures of the aforementioned applications are hereby incorporated by reference in their entireties.

TECHNICAL FIELD

The present disclosure relates to the field of communications technologies, and in particular, to a resource configuration method, an apparatus, and a system.

BACKGROUND

In a wireless communications system, data is transmitted between communications devices by using an air interface resource. The communications device may be a network device or a terminal. The air interface resource may be at least one of a code resource, a time domain resource, and a frequency domain resource. The air interface resource may also be referred to as a resource for short.

When communicating with a terminal, a network device may configure a resource for the terminal, and the network device and the terminal may transmit data on the configured resource. The resource configured for the terminal may be a preconfigured resource, or may be a resource configured for the terminal by the network device by using signaling. In a data transmission process, resource configuration for a terminal plays an important role in data transmission. Therefore, in the wireless communications system, the resource configuration for the terminal may be a research focus.

SUMMARY

The present disclosure provides a resource configuration method, an apparatus, and a system, to reduce a data conflict between different terminals in a data transmission process.

According to a first aspect, the present disclosure provides a resource configuration method, including: determining a reserved resource element (RE) in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1; and receiving data transmission on all or some REs other than the reserved resource. According to the method, a data conflict between different terminals during data transmission can be reduced, and resource utilization can be improved.

In a first design, according to the first aspect, the method further includes: receiving resource unit size configuration signaling, where the resource unit size configuration signaling is used to indicate at least one of X and Y. According to the method, a size of the resource unit can be flexibly configured.

In a second design, according to the first aspect or the first design of the first aspect, the determining a reserved RE in a resource unit includes: determining the reserved RE in the resource unit based on a reserved-RE pattern. The reserved RE is in y1 symbols of the resource unit based on the reserved-RE pattern, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers. According to the method, signaling overheads for configuring the reserved RE can be reduced.

In a third design, according to the second design of the first aspect, the reserved-RE pattern is included in M available reserved-RE patterns. The method further includes: receiving a reference signal indication, where the M available reserved-RE patterns are some or all of reference signal patterns corresponding to the reference signal indication. According to the method, the reserved RE can be flexibly configured while the signaling overheads for configuring the reserved RE are reduced.

In a fourth design, according to the first aspect or the first design of the first aspect, the method further includes: receiving reserved-RE configuration information, where the reserved-RE configuration information is used to indicate the reserved RE configured in the resource unit. According to the method, the reserved RE can be flexibly configured.

In a fifth design, according to any one of the first aspect or the previous designs of the first aspect, the method further includes: receiving resource unit frequency allocation information that is used to determine an allocated resource unit in a frequency resource with a granularity of X RBs; and receiving resource unit time domain allocation information that is used to determine an allocated resource unit in a time domain resource with a granularity of Y symbols.

In a sixth design, according to any one of the first aspect or the previous designs of the first aspect, a subcarrier spacing corresponding to the resource unit is a minimum subcarrier spacing supported by a current frequency band, or a subcarrier spacing corresponding to the resource unit is a subcarrier spacing used to transmit a system message. According to the method, signaling overheads for configuring the subcarrier spacing corresponding to the resource unit can be reduced.

In a seventh design, according to any one of the first aspect or the first to the fifth design of the first aspect, the method further includes: receiving resource unit subcarrier spacing configuration signaling, where the resource unit subcarrier spacing configuration signaling is used to indicate a subcarrier spacing corresponding to the resource unit. According to the method, the subcarrier spacing corresponding to the resource unit can be flexibly configured.

According to a second aspect, the present disclosure provides a resource configuration method, including: determining a reserved RE in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1; and sending data on all or some REs other than the reserved resource.

In a first design, according to the second aspect, the method further includes: sending resource unit size configuration signaling, where the resource unit size configuration signaling is used to indicate at least one of X and Y.

In a second design, according to the second aspect or the first design of the second aspect, the determining a reserved RE in a resource unit includes: determining the reserved RE in the resource unit based on a reserved-RE pattern. The reserved RE is in y1 symbols of the resource unit based on the reserved-RE pattern, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers.

In a third design, according to the second design of the second aspect, the reserved-RE pattern is included in M available reserved-RE patterns. The method further includes: sending a reference signal indication, where the M available reserved-RE patterns are some or all of reference signal patterns corresponding to the reference signal indication.

In a fourth design, according to the second aspect or the first design of the second aspect, the method further includes: sending reserved-RE configuration information, where the reserved-RE configuration information is used to indicate the reserved RE configured in the resource unit.

In a fifth design, according to any one of the second aspect or the previous designs of the second aspect, the method further includes: sending resource unit frequency allocation information, where the resource unit frequency allocation information is used to determine an allocated resource unit in a frequency resource with a granularity of X RBs; and sending resource unit time domain allocation information, where the resource unit time domain allocation information is used to determine an allocated resource unit in a time domain resource with a granularity of Y symbols.

In a sixth design, according to any one of the second aspect or the previous designs of the second aspect, a subcarrier spacing corresponding to the resource unit is a minimum subcarrier spacing supported by a current frequency band, or a subcarrier spacing corresponding to the resource unit is a subcarrier spacing used to transmit a system message.

In a seventh design, according to any one of the second aspect or the first to the fifth design of the second aspect, the method further includes: sending resource unit subcarrier spacing configuration signaling, where the resource unit subcarrier spacing configuration signaling is used to indicate a subcarrier spacing corresponding to the resource unit.

According to a third aspect, the present disclosure provides an apparatus. The apparatus can implement the function described in the first aspect and the functions described in the designs of the first aspect. The functions may be implemented in a form of a hardware structure, a software module, or a combination of a hardware structure and a software module. The hardware structure or the software module includes one or more modules corresponding to the foregoing functions.

In a first design, according to the third aspect, the apparatus includes: a reserved-RE determining module and a transceiver module. The reserved-RE determining module is configured to determine a reserved RE in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1. The transceiver module is configured to receive data on all or some REs other than the reserved resource.

In a second design, according to the first design of the third aspect, the transceiver module is further configured to receive resource unit size configuration signaling, where the resource unit size configuration signaling is used to indicate at least one of X and Y. The apparatus may further include a resource unit size determining module, configured to determine X and Y. For example, the resource unit size determining module determines the at least one of X and Y based on the resource unit size configuration signaling received by the transceiver module; or the resource unit size determining module determines the at least one of X and Y based on a preconfiguration.

In a third design, according to any one of the previous designs of the third aspect, the reserved-RE determining module determines the reserved RE in the resource unit based on a reserved-RE pattern. The reserved RE is in y1 symbols of the resource unit based on the reserved-RE pattern, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers.

In a fourth design, according to any one of the previous designs of the third aspect, the reserved-RE pattern is included in M available reserved-RE patterns. The transceiver module is further configured to receive a reference signal indication, and the M available reserved-RE patterns are some or all of reference signal patterns corresponding to the reference signal indication.

In a fifth design, according to the first or the second design of the third aspect, the transceiver module is further configured to receive reserved-RE configuration information, where the reserved-RE configuration information is used to indicate the reserved RE configured in the resource unit. The reserved-RE determining module determines the reserved RE in the resource unit based on the reserved-RE configuration information received by the transceiver module.

In a sixth design, according to any one of the previous designs of the third aspect, the transceiver module is further configured to receive resource unit frequency allocation information, where the resource unit frequency allocation information is used to determine an allocated resource unit in a frequency resource with a granularity of X RBs. The transceiver module is further configured to receive resource unit time domain allocation information, where the resource unit time domain allocation information is used to determine an allocated resource unit in a time domain resource with a granularity of Y symbols. The apparatus may further include a resource unit position determining module, configured to determine a resource unit allocated in a time-frequency resource. For example, the resource unit position determining module is configured to determine the allocated resource unit in the frequency resource based on the resource unit frequency allocation information. The resource unit position determining module is configured to determine the allocated resource unit in the time domain resource based on the resource unit time domain allocation information.

In a seventh design, according to any one of the previous designs of the third aspect, the transceiver module is further configured to receive resource unit subcarrier spacing configuration signaling, where the resource unit subcarrier spacing configuration signaling is used to indicate a subcarrier spacing corresponding to the resource unit. The apparatus further includes a resource unit subcarrier spacing determining module, configured to determine the subcarrier spacing corresponding to the resource unit. For example, the resource unit subcarrier spacing determining module determines that the subcarrier spacing corresponding to the resource unit is a minimum subcarrier spacing supported by a current frequency band or a subcarrier spacing used to transmit a system message. The resource unit subcarrier spacing determining module determines, based on the resource unit subcarrier spacing configuration signaling received by the transceiver module, the subcarrier spacing corresponding to the resource unit.

According to a fourth aspect, the present disclosure provides an apparatus. The apparatus can implement the function described in the second aspect and the functions described in the designs of the second aspect. The functions may be implemented in a form of a hardware structure, a software module, or a combination of a hardware structure and a software module. The hardware structure or the software module includes one or more modules corresponding to the foregoing functions.

In a first design, according to the fourth aspect, the apparatus includes: a reserved-RE determining module and a transceiver module. The reserved-RE determining module is configured to determine a reserved RE in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1. The transceiver module is configured to send data on all or some REs other than the reserved resource.

In a second design, according to the first design of the fourth aspect, the transceiver module is further configured to send resource unit size configuration signaling, where the resource unit size configuration signaling is used to indicate at least one of X and Y.

In a third design, according to any one of the previous designs of the fourth aspect, the reserved-RE determining module determines the reserved RE in the resource unit based on a reserved-RE pattern. The reserved RE is in y1 symbols of the resource unit based on the reserved-RE pattern, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers.

In a fourth design, according to any one of the previous designs of the fourth aspect, the reserved-RE pattern is included in M available reserved-RE patterns. The transceiver module is further configured to send a reference signal indication, and the M available reserved-RE patterns are some or all of reference signal patterns corresponding to the reference signal indication.

In a fifth design, according to the first or the second design of the fourth aspect, the transceiver module is further configured to send reserved-RE configuration information, where the reserved-RE configuration information is used to indicate the reserved RE configured in the resource unit.

In a sixth design, according to any one of the previous designs of the fourth aspect, the transceiver module is further configured to send resource unit frequency allocation information, where the resource unit frequency allocation information is used to determine an allocated resource unit in a frequency resource with a granularity of X RBs. The transceiver module is further configured to send resource unit time domain allocation information, where the resource unit time domain allocation information is used to determine an allocated resource unit in a time domain resource with a granularity of Y symbols.

In a seventh design, according to any one of the previous designs of the fourth aspect, the transceiver module is further configured to send resource unit subcarrier spacing configuration signaling, where the resource unit subcarrier spacing configuration signaling is used to indicate a subcarrier spacing corresponding to the resource unit. The apparatus further includes a resource unit subcarrier spacing determining module, configured to determine the subcarrier spacing corresponding to the resource unit. For example, the resource unit subcarrier spacing determining module determines that the subcarrier spacing corresponding to the resource unit is a minimum subcarrier spacing supported by a current frequency band or a subcarrier spacing used to transmit a system message.

According to a fifth aspect, the present disclosure provides an apparatus, including: a processor; a memory, where the memory is coupled to the processor, and the processor executes an instruction stored in the memory; and a transceiver, where the transceiver is coupled to the processor. The processor is configured to determine a reserved resource element (RE) in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1. The processor is further configured to receive data on all or some REs other than the reserved resource by using the transceiver.

In a first design, according to the fifth aspect, the processor is further configured to receive resource unit size configuration signaling by using the transceiver, where the resource unit size configuration signaling is used to indicate at least one of X and Y. The processor is further configured to determine the at least one of X and Y based on the resource unit size configuration signaling.

In a second design, according to the fifth aspect or the first design of the fifth aspect, that the processor is configured to determine a reserved resource element (RE) in a resource unit includes: the processor is configured to determine the reserved RE in the resource unit based on a reserved-RE pattern. The processor determines, based on the reserved-RE pattern, that the reserved RE is in y1 symbols of the resource unit, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers.

In a third design, according to any one of the fifth aspect or the previous designs of the fifth aspect, the reserved-RE pattern is included in M available reserved-RE patterns. The processor is further configured to receive a reference signal indication by using the transceiver, where the M available reserved-RE patterns are some or all of reference signal patterns corresponding to the reference signal indication.

In a fourth design, according to the fifth aspect or the first design of the fifth aspect, the processor is further configured to receive reserved-RE configuration information by using the transceiver, where the reserved-RE configuration information is used to indicate the reserved RE configured in the resource unit. The processor is further configured to determine the reserved RE in the resource unit based on the reserved-RE configuration information.

In a fifth design, according to any one of the fifth aspect or the previous designs of the fifth aspect, the processor is further configured to receive resource unit frequency allocation information by using the transceiver, where the resource unit frequency allocation information is used to determine an allocated resource unit in a frequency resource with a granularity of X RBs. The processor is further configured to determine a position of the allocated resource unit in frequency based on the resource unit frequency allocation information. The processor is further configured to receive resource unit time domain allocation information by using the transceiver, where the resource unit time domain allocation information is used to determine an allocated resource unit in a time domain resource with a granularity of Y symbols. The processor is further configured to determine a position of the allocated resource unit in time domain based on the resource unit time domain allocation information.

In a sixth design, according to any one of the fifth aspect or the previous designs of the fifth aspect, the processor is further configured to determine that a subcarrier spacing corresponding to the resource unit is a minimum subcarrier spacing supported by a current frequency band, or a subcarrier spacing corresponding to the resource unit is a subcarrier spacing used to transmit a system message.

In a seventh design, according to any one of the fifth aspect or the first to the fifth design of the fifth aspect, the processor is further configured to receive resource unit subcarrier spacing configuration signaling by using the transceiver, where the resource unit subcarrier spacing configuration signaling is used to indicate a subcarrier spacing corresponding to the resource unit. The processor is further configured to determine, based on the resource unit subcarrier spacing configuration signaling, the subcarrier spacing corresponding to the resource unit.

According to a sixth aspect, the present disclosure provides an apparatus, including: a processor; a memory, where the memory is coupled to the processor, and the processor executes a program instruction stored in the memory; and a transceiver, where the transceiver is coupled to the processor. The processor is configured to determine a reserved resource element (RE) in a resource unit, where the reserved RE is included in a reserved resource, the resource unit includes X resource blocks (RBs) in frequency domain, and the resource unit includes Y symbols in time domain, where X and Y are positive integers, Y is greater than 1 when X is equal to 1, and X is greater than 1 when Y is equal to 1. The processor is further configured to send data on all or some REs other than the reserved resource by using the transceiver.

In a first design, according to the sixth aspect, the processor is further configured to send resource unit size configuration signaling by using the transceiver, where the resource unit size configuration signaling is used to indicate at least one of X and Y.

In a second design, according to the sixth aspect or the first design of the sixth aspect, that the processor is configured to determine a reserved resource element (RE) in a resource unit includes: the processor is configured to determine the reserved RE in the resource unit based on a reserved-RE pattern. The processor determines, based on the reserved-RE pattern, that the reserved RE is in y1 symbols of the resource unit, where y1 is an integer greater than or equal to 1 and less than or equal to Y. When y1 is greater than 1, in the y1 symbols, reserved REs in different symbols correspond to a same subcarrier; or in the y1 symbols, reserved REs in at least two symbols correspond to different subcarriers.

In a third design, according to any one of the sixth aspect or the previous designs of the sixth aspect, the reserved-RE pattern is included in M available reserved-RE patterns. The processor is further configured to send a reference signal indication by using the transceiver, where the M available reserved-RE patterns are some or all of reference signal patterns corresponding to the reference signal indication.

In a fourth design, according to the sixth aspect or the first design of the sixth aspect, the processor is further configured to send reserved-RE configuration information by using the transceiver, where the reserved-RE configuration information is used to indicate the reserved RE configured in the resource unit.

In a fifth design, according to any one of the sixth aspect or the previous designs of the sixth aspect, the processor is further configured to send resource unit frequency allocation information by using the transceiver, where the resource unit frequency allocation information is used to determine an allocated resource unit in a frequency resource with a granularity of X RBs. The processor is further configured to send resource unit time domain allocation information by using the transceiver, where the resource unit time domain allocation information is used to determine an allocated resource unit in a time domain resource with a granularity of Y symbols.

In a sixth design, according to any one of the sixth aspect or the previous designs of the sixth aspect, the processor is further configured to determine that a subcarrier spacing corresponding to the resource unit is a minimum subcarrier spacing supported by a current frequency band, or a subcarrier spacing corresponding to the resource unit is a subcarrier spacing used to transmit a system message.

In a seventh design, according to any one of the sixth aspect or the first to the fifth design of the sixth aspect, the processor is further configured to send resource unit subcarrier spacing configuration signaling by using the transceiver, where the resource unit subcarrier spacing configuration signaling is used to indicate a subcarrier spacing corresponding to the resource unit.

According to a seventh aspect, the present disclosure provides a communications system. The communications system includes the apparatus according to the third aspect and the apparatus according to the fourth aspect.

According to an eighth aspect, the present disclosure provides a communications system. The communications system includes the apparatus according to the fifth aspect and the apparatus according to the sixth aspect.

According to a ninth aspect, the present disclosure provides a chip system. The chip system includes a processor, may further include a memory, and is configured to implement at least one of the first aspect and the designs of the first aspect. The chip system may include a chip, or may include a chip and another discrete component.

According to a tenth aspect, the present disclosure provides a chip system. The chip system includes a processor, may further include a memory, and is configured to implement at least one of the second aspect and the designs of the second aspect. The chip system may include a chip, or may include a chip and another discrete component.

According to an eleventh aspect, the present disclosure provides a computer program product including an instruction. When the computer program product is run on a computer, the computer is enabled to perform at least one of the first aspect and the designs of the first aspect.

According to a twelfth aspect, the present disclosure provides a computer program product including an instruction. When the computer program product is run on a computer, the computer is enabled to perform at least one of the second aspect and the designs of the second aspect.

DESCRIPTION OF EMBODIMENTS

Figure 1:
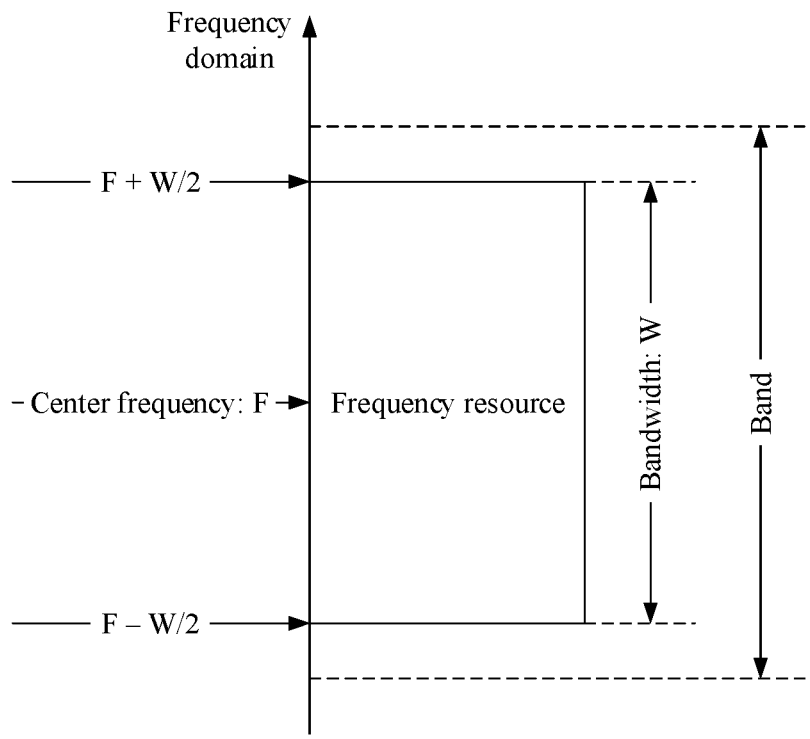
FIG. 1 is an example of a diagram of a position of a frequency resource according to an embodiment of the present disclosure.

A network architecture and a service scenario described in the embodiments of the present disclosure do not constitute a limitation on the technical solutions provided in the embodiments of the present disclosure. As the network architecture evolves or a new service scenario emerges, the technical solutions provided in the embodiments of the present disclosure are also applicable to similar technical issues.

The technical solutions provided in the embodiments of the present disclosure may be applied to a wireless communications system that can allocate an air interface resource. For example, the technical solutions provided in the embodiments of the present disclosure may be applied to a 5th generation mobile communications technology (5G) system, and may also be applied to another system based on orthogonal frequency division multiplexing (OFDM) in addition to the 5G system. The 5G system may also be referred to as new radio (NR).

The wireless communications system includes communications devices, and the communications devices may perform wireless communication by using an air interface resource. The communications devices include a network device and a terminal, and the network device may also be referred to as a network-side device. The wireless communication between the communications devices includes: wireless communication between a network device and a terminal, wireless communication between network devices, and wireless communication between terminals. When the communications devices perform the wireless communication by using the air interface resource, a communications device managing and/or allocating the air interface resource may also be referred to as a scheduling entity, and a scheduled communications device may also be referred to as a subordinate entity. For example, when the network device performs wireless communication with the terminal, the network device may also be referred to as a scheduling entity, and the terminal may also be referred to as a subordinate entity. The technical solutions provided in the embodiments of the present disclosure may be applied to wireless communication between the scheduling entity and the subordinate entity. The technical solutions provided in the embodiments of the present disclosure are described in the embodiments of the present disclosure by using wireless communication between a network device and a terminal as an example. In the embodiments of the present disclosure, the term "wireless communication" may also be referred to as "communication" for short, and the term "communication" may also be described as "data transmission".

The terminal in the embodiments of the present disclosure may also be referred to as a terminal device, and is a device having wireless transmission and reception functions. The terminal may be deployed on land, and may be an indoor device, an outdoor device, a handheld device, or a vehicle-mounted device; may be deployed on the surface of water (for example, in a ship); or may be deployed in the air (for example, on an airplane, a balloon, and a satellite). The terminal may be user equipment (UE), and the UE may be a handheld device, a vehicle-mounted device, a wearable device, or a computing device that has a wireless communication function. For example, the UE may be a mobile phone, a tablet computer, or a computer having wireless transmission and reception functions. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of the present disclosure, an apparatus for implementing a function of a terminal may be a terminal, or may be an apparatus that can support a terminal in implementing the function. In the embodiments of the present disclosure, the technical solutions provided in the embodiments of the present disclosure are described by using an example in which an apparatus for implementing a function of a terminal is a terminal and the terminal is a UE.

The network device in the embodiments of the present disclosure includes a base station (BS), and is a device that is deployed in a radio access network and that can perform wireless communication with the terminal. The base station may be in a plurality of forms, for example, a macro base station, a micro base station, a relay station, and an access point. When a macro base station and a micro base station perform wireless communication, the macro base station may manage an air interface resource and allocate the air interface resource to the micro base station, and the macro base station and the micro base station may perform data transmission on the allocated air interface resource. In this communication scenario, the macro base station may also be referred to as a scheduling entity, and the micro base station may also be referred to as a subordinate entity. The base station in the embodiments of the present disclosure may be a base station in a 5G system, and the base station in the 5G system may also be referred to as a transmission reception point (TRP) or a gNB. In the embodiments of the present disclosure, an apparatus for implementing a function of a network device may be a network device, or may be an apparatus that can support a network device in implementing the function. In the embodiments of the present disclosure, the technical solutions provided in the embodiments of the present disclosure are described by using an example in which an apparatus for implementing a function of a network device is a network device and the network device is a gNB.

In the wireless communications system, the gNB and the UE may perform wireless communication by using an air interface resource. In a possible wireless communications system, for example, in the 5G system, the air interface resource includes a frequency resource. The frequency resource may fall within a specified frequency range, and the frequency range may also be referred to as a band or a frequency band. In the embodiments of the present disclosure, the frequency resource may also be referred to as a frequency domain resource. In frequency domain, a center point of the frequency resource may be referred to as a center frequency, and a width of the frequency resource may be referred to as a bandwidth (BW). For example, FIG. 1 is a schematic diagram of a position of a frequency resource. As shown in FIG. 1, the frequency resource may be some or all resources in a band, a bandwidth of the frequency resource is W, and the center frequency is F. Frequencies at boundary points of the frequency resource are respectively F−W/2 and F+W/2. This may also be described as: a highest frequency in the frequency resource is F+W/2, and a lowest frequency in the frequency resource is F−W/2. In the wireless communications system, a frequency resource used for downlink communication may be the same as or different from a frequency resource used for uplink communication. This is not limited in the present disclosure.

When the gNB and the UE perform wireless communication by using the frequency resource, the gNB manages a system frequency resource, and allocates the frequency resource in the system frequency resource to the UE, so that the gNB and the UE can perform communication by using the allocated frequency resource. The system frequency resource may be a frequency resource that can be managed and allocated by the gNB, or may be a frequency resource that can be used for communication between the gNB and the UE. In the embodiments of the present disclosure, the system frequency resource may also be referred to as a system resource or a transmission resource. In frequency domain, a width of the system frequency resource may be referred to as a bandwidth of the system frequency resource, and may also be referred to as a system bandwidth or a transmission bandwidth.

Figure 2:
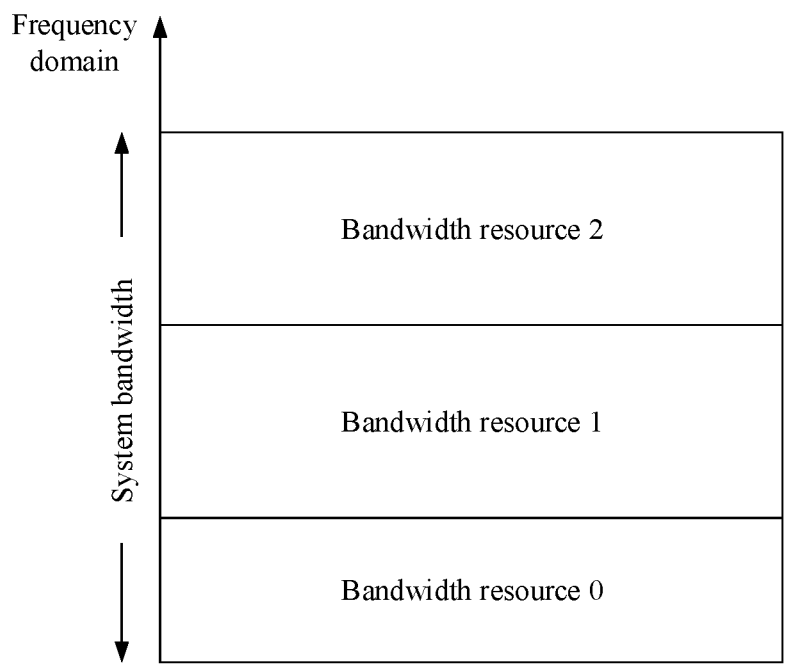
FIG. 2 is an example of a structural diagram of bandwidth resources in a system frequency resource according to an embodiment of the present disclosure.

A possible design of allocating the frequency resource by the gNB to the UE is: The gNB configures a bandwidth resource in the system frequency resource for the UE, and the gNB schedules the UE on the configured bandwidth resource. This may also be described as: The gNB configures a bandwidth resource in the system frequency resource for the UE, so that the gNB can allocate some or all resources in the configured bandwidth resource to the UE for communication between the gNB and the UE. The bandwidth resource is included in the system frequency resource, and may be some contiguous or discontiguous resources in the system frequency resource or may be all resources in the system frequency resource. The bandwidth resource may also be referred to as a bandwidth part, a frequency resource part, a part of a frequency resource, a carrier bandwidth part, or another name. This is not limited in the present disclosure. When the bandwidth resource is a segment of contiguous resources in the system frequency resource, the bandwidth resource may also be referred to as a subband, a narrowband, or another name. This is not limited in the present disclosure. For example, FIG. 2 is a schematic structural diagram of bandwidth resources in a system frequency resource. As shown in FIG. 2, the system frequency resource includes three different bandwidth resources in total: a bandwidth resource 0, a bandwidth resource 1, and a bandwidth resource 2. In an actual application, the system frequency resource may include any integer quantity of bandwidth resources. This is not limited in the present disclosure. For different bandwidth resources, using a bandwidth resource A and a bandwidth resource B as an example, that the bandwidth resource A and the bandwidth resource B are different includes at least one of the following cases: some or all frequency resources included in the bandwidth resource A is not included in the bandwidth resource B, some or all frequency resources included in the bandwidth resource B is not included in the bandwidth resource A, and a parameter of the bandwidth resource A is different from a parameter of the bandwidth resource B. The parameter includes at least one of a subcarrier spacing and a cyclic prefix (CP). In a process of researching and formulating standards of the wireless communications system by the third generation partnership project (3GPP), the parameter may also be referred to as a numerology in English. For example, in an OFDM-based communications system, that the bandwidth resource A and the bandwidth resource B are different may be at least one of the following cases: at least one subcarrier included in the bandwidth resource A is not included in the bandwidth resource B, at least one subcarrier included in the bandwidth resource B is not included in the bandwidth resource A, and a parameter of the bandwidth resource A is different from a parameter of the bandwidth resource B.

For example, the foregoing possible design of allocating the frequency resource by the gNB to the UE may be applied to but is not limited to the following three scenarios:

Scenario 1: High-Bandwidth Scenario

In a communications system, as a service volume of the UE and a quantity of UEs increase, a system service volume greatly increases. Therefore, a design of using a high bandwidth as a system bandwidth is proposed in an existing communications system, and is used to provide a relatively large quantity of system resources, so that a relatively high data transmission rate can be provided. In a communications system in which a system bandwidth is a high bandwidth, considering costs of a UE and a service volume of the UE, a bandwidth supported by the UE may be lower than the system bandwidth. A higher bandwidth supported by the UE indicates a higher processing capability of the UE, a possible higher data transmission rate of the UE, and possible higher design costs of the UE. The bandwidth supported by the UE may also be referred to as a bandwidth capability of the UE. For example, in a 5G system, a maximum of the system bandwidth may be 400 MHz, and the bandwidth capability of the UE may be 20 MHz, 50 MHz, 100 MHz, or the like. In a wireless communications system, bandwidth capabilities of different UEs may be the same or may be different. This is not limited in the embodiments of the present disclosure.

In the communications system in which the system bandwidth is the high bandwidth, because the bandwidth capability of the UE is lower than the system bandwidth, the gNB may configure a bandwidth resource in the system frequency resource for the UE. A bandwidth of the bandwidth resource is lower than or equal to the bandwidth capability of the UE. When the UE communicates with the gNB, the gNB may allocate, to the UE, some or all resources in the bandwidth resource configured for the UE, for the communication between the gNB and the UE.

Scenario 2: Multi-Parameter Scenario

In a wireless communications system, for example, in a 5G system, a design of supporting a plurality of parameters is proposed to support more service types and/or communication scenarios. A separate numerology may be set for each of different service types and/or communication scenarios.

In a possible configuration, the gNB may configure a plurality of bandwidth resources in the system frequency resource, and configure a separate numerology for each of the plurality of bandwidth resources, to support a plurality of service types and/or communication scenarios in the system frequency resource. Numerologies of different bandwidth resources may be the same or may be different. This is not limited in the present disclosure.

When the UE communicates with the gNB, the gNB may determine, based on a service type and/or a communication scenario that corresponds to the communication, a numerology A used for the communication, to configure a corresponding bandwidth resource for the UE based on the numerology A. A numerology of the corresponding bandwidth resource is configured as the numerology A. When the UE communicates with the gNB, the gNB may allocate, to the UE, some or all resources in the bandwidth resource configured for the UE, for the communication between the gNB and the UE.

Scenario 3: Bandwidth Fallback

When the UE communicates with the gNB, the gNB may configure a bandwidth resource for the UE based on a service volume of the UE, to reduce power consumption of the UE. For example, if the UE has no service, the UE may receive control information only on a bandwidth resource with a relatively low bandwidth, to reduce radio frequency processing workloads and baseband processing workloads of the UE, thereby reducing the power consumption of the UE. If the service volume of the UE is relatively small, the gNB may configure a bandwidth resource with a relatively low bandwidth for the UE, to reduce radio frequency processing workloads and baseband processing workloads of the UE, thereby reducing the power consumption of the UE. If the service volume of the UE is relatively large, the gNB may configure a bandwidth resource with a relatively high bandwidth for the UE, to provide a higher data transmission rate. When the UE communicates with the gNB, the gNB may allocate, to the UE, some or all resources in the bandwidth resource configured for the UE, for the communication between the gNB and the UE.

When the gNB and the UE perform communication, a reference signal (RS) may be transmitted for channel state estimation. The gNB and the UE may perform data transmission in a manner based on an estimated channel state, to improve the data transmission rate. The channel state estimation may also be referred to as channel estimation for short, and the channel estimation may also be described as channel sounding. In the embodiments of the present disclosure, the RS is mainly used for channel estimation or channel sounding, and may also be referred to as a pilot or another name. This is not limited in the present disclosure.

For example, when the gNB and the UE perform downlink data transmission, the gNB sends a channel state information-reference signal (CSI-RS) to the UE. The UE performs channel estimation based on the received CSI-RS, and sends estimated channel state information to the gNB. The gNB may send downlink data to the UE in a matched manner based on a channel state corresponding to the channel state information, thereby improving a downlink data transmission rate. In this embodiment of the present disclosure, the CSI-RS is a reference signal sent by the gNB to the UE, and is used for downlink channel estimation or downlink channel sounding. The CSI-RS may also be referred to as a downlink reference signal or another name. This is not limited in the present disclosure. Further, a reference signal used for downlink channel estimation may further include at least one of a cell-specific reference signal (CRS) and a downlink demodulation reference signal (DMRS).

For another example, when the gNB and the UE perform uplink data transmission, the UE sends a sounding reference signal (SRS) to the gNB. The gNB performs channel estimation based on the received SRS, and determines a transmission parameter based on an estimated channel state. The gNB may send the transmission parameter to the UE. The UE receives the transmission parameter sent by the gNB, and sends uplink data to the gNB based on the transmission parameter. According to this design, the UE may send the uplink data to the gNB in a matched manner based on the channel state, to improve an uplink data transmission rate. In the embodiments of the present disclosure, the SRS is a reference signal sent by the UE to the gNB, and is used for uplink channel estimation or uplink channel sounding. The SRS may also be referred to as an uplink reference signal or another name. This is not limited in the present disclosure. Further, a reference signal used for uplink channel estimation may further include an uplink DMRS.

In subsequent embodiments of the present disclosure, the technical solutions provided in the embodiments of the present disclosure are described by using an example in which a reference signal is a CSI-RS.

Figure 3:
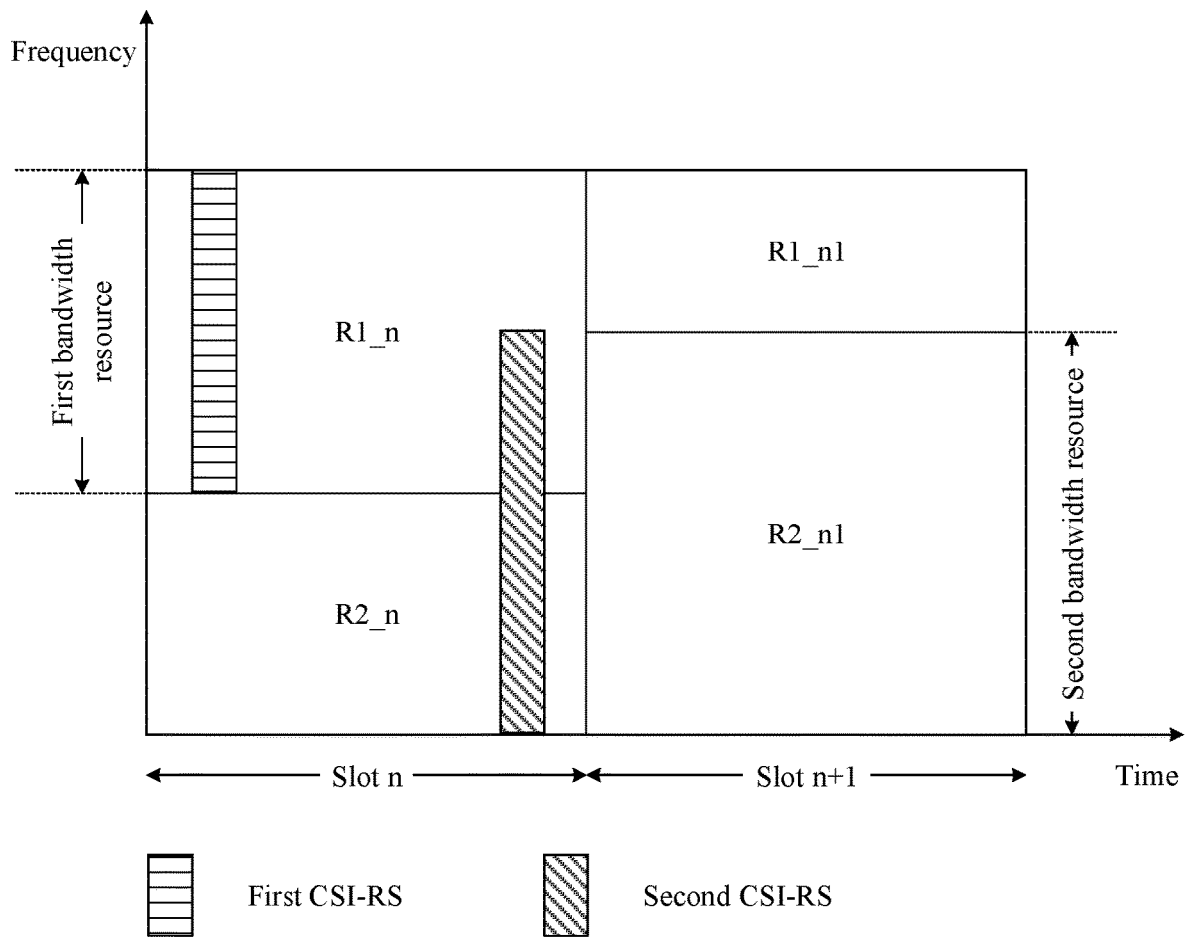
FIG. 3 is an example of a diagram of bandwidth resources configured by a gNB for first UE and second UE according to an embodiment of the present disclosure.

In the wireless communications system, the gNB may configure a bandwidth resource for each of a plurality of UEs in the system frequency resource, so that the gNB performs data transmission with the plurality of UEs. For example, using two UEs as an example, the two UEs are respectively first UE and second UE, and the gNB may configure bandwidth resources for the first UE and the second UE in the system frequency resource. FIG. 3 is an example of a diagram of bandwidth resources configured by a gNB for first UE and second UE. As shown in FIG. 3, the bandwidth resource configured by the gNB for the first UE is a first bandwidth resource, the bandwidth resource configured for the second UE is a second bandwidth resource, and the first bandwidth resource and the second bandwidth resource partially overlap in frequency domain.

The gNB may send a first CSI-RS to the first UE on the first bandwidth resource, to perform channel estimation on the first bandwidth resource. The gNB may allocate a resource to the first UE in the first bandwidth resource based on a result of the channel estimation and/or a data volume of the first UE. The gNB and the first UE may perform data transmission on the allocated resource. The data volume of the UE may also be referred to as a service volume of the UE. For example, in a slot n, a resource allocated by the gNB to the first UE in the first bandwidth resource is R1_n; and in a slot n+1, a resource allocated by the gNB to the first UE in the first bandwidth resource is R1_n1.

The gNB may send, on the second bandwidth resource, a second CSI-RS to the second UE, to perform channel estimation on the second bandwidth resource. The gNB may allocate a resource to the second UE in the second bandwidth resource based on a result of the channel estimation and/or a data volume of the second UE, and the gNB and the second UE perform data transmission on the allocated resource. For example, in a slot n, a resource allocated by the gNB to the second UE in the second bandwidth resource is R2_n; and in a slot n+1, a resource allocated by the gNB to the second UE in the second bandwidth resource is R2_n1.

As shown in FIG. 3, in the slot n, the resource R1_n allocated by the gNB to the first UE may include a resource in an overlapping part between the first bandwidth resource and the second bandwidth resource. If the gNB sends the second CSI-RS to the second UE in the slot n, a resource used to transmit the second CSI-RS may also include the resource in the overlapping part between the first bandwidth resource and the second bandwidth resource. In this case, data of the first UE may conflict with the second CSI-RS. Consequently, data transmission of the first UE and/or transmission of the second CSI-RS may be affected.

Based on the foregoing analysis, it can be learned that during data transmission, when the gNB configures the bandwidth resource for each of the plurality of UEs in the system frequency resource, a data conflict between different UEs may be caused. Consequently, data transmission performance of each UE is affected. To resolve the conflict, the embodiments of the present disclosure provide a resource configuration method, an apparatus, and a system. Further, according to the resource configuration method, the apparatus, and the system that are provided in the embodiments of the present disclosure, another type of data conflict may further be resolved. This is not limited in the present disclosure. For example, the another type of conflict may be any one of the following three conflicts:

First conflict: a conflict in a backward compatible scenario. Data of another existing system may be transmitted on a resource of NR, or data of NR may be transmitted on a resource of another existing system. In this case, the data of NR may conflict with the data of the another existing system. For example, the another existing system may be a long term evolution (LTE) system, a code division multiple access (CDMA) system, or a global system for mobile communications system (GSM).

Second conflict: a conflict in a forward compatible scenario. Data in a future system may be transmitted on a resource of NR, or data of NR may be transmitted on a resource in a future system. In this case, the data of NR may conflict with the data in the future system. The future system may also be referred to as a future network, a future evolved version, or another name. This is not limited in the present disclosure.

Third conflict: a conflict in coordinated multipoint transmission. In a coordinated multipoint scenario, one or more base stations may perform data transmission with a same UE in a plurality of cells. In this case, a conflict may exist between data transmitted in different cells.

Figure 4:
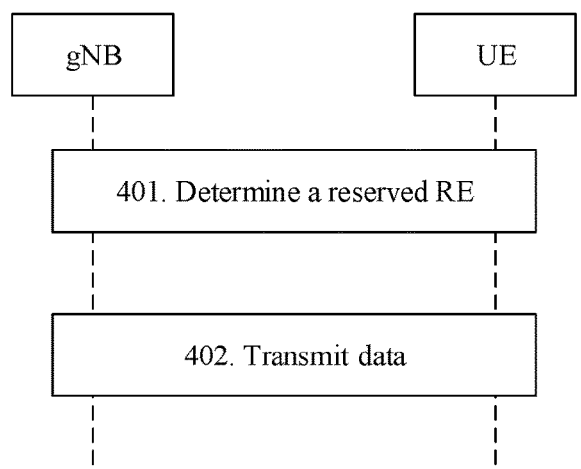
FIG. 4 is a schematic diagram of a resource configuration method according to an embodiment of the present disclosure.

FIG. 4 is a schematic diagram of a resource configuration method according to an embodiment of the present disclosure.

Block 401. A gNB and a UE determine a reserved resource element (RE) in a resource unit, where the reserved RE is included in a reserved resource. The resource unit includes X resource blocks (RB) in frequency domain, and includes Y symbols in time domain, where X and Y are positive integers.

The gNB and the UE may determine at least one of X and Y through preconfiguration.

Alternatively, the gNB may send resource unit size configuration signaling to the UE, to indicate X, Y, or X and Y. The UE receives the resource unit size configuration signaling, and correspondingly determines at least one of X and Y. The resource unit size configuration signaling is used to indicate X, Y, or X and Y. The resource unit size configuration signaling may also be referred to as another name. This is not limited in the present disclosure. If the resource unit size configuration signaling is used to indicate X, the UE determines X based on the received resource unit size configuration signaling. If the resource unit size configuration signaling is used to indicate Y, the UE determines Y based on the received resource unit size configuration signaling. If the resource unit size configuration signaling is used to indicate X and Y, the UE determines X and Y based on the received resource unit size configuration signaling.

In this embodiment of the present disclosure, signaling may be higher layer signaling or physical layer signaling. The higher layer signaling may be radio resource control (RRC) signaling, a broadcast message, a system message, or a medium access control (MAC) control element (CE). The physical layer signaling may be signaling carried on a physical control channel or signaling carried on a physical data channel. The signaling carried on the physical control channel may be signaling carried on a physical downlink control channel, signaling carried on an enhanced physical downlink control channel (EPDCCH), signaling carried on a narrowband physical downlink control channel (NPDCCH), or signaling carried on a machine type communication (MTC) physical downlink control channel (MPDCCH). The signaling carried on the physical downlink control channel may also be referred to as downlink control information (DCI). The signaling carried on the physical control channel may alternatively be signaling carried on a physical sidelink control channel, and the signaling carried on the physical sidelink control channel may also be referred to as sidelink control information (SCI).

For example, both X and Y are equal to 1. For another example, Y is greater than 1 when X is equal to 1, and X is greater than 1 when Y is equal to 1. That Y is greater than 1 when X is equal to 1, and X is greater than 1 when Y is equal to 1 may further be described as that X and Y are not equal to 1 at the same time. For still another example, both X and Y are greater than 1.

Block 402. The gNB and the UE perform data transmission on all or some resources other than the reserved resource.

For example, the gNB and the UE perform the data transmission on all or some REs other than the reserved resource. In this embodiment of the present disclosure, the data transmission includes at least one of data receiving and data sending.

In a wireless communications system, for example, in an OFDM-based communications system, an air interface resource may include a frequency resource and a time domain resource. The frequency resource and the time domain resource may be combined to be referred to as a time-frequency resource.

A unit of the frequency resource may be a subcarrier, an RB, or a resource block group (RBG). One RBG may include at least one RB. The RB may be a physical resource block (PRB), or may be a virtual resource block (VRB).

In frequency domain, a resource that can be used for data transmission includes several resource grids, one resource grid corresponds to one subcarrier, and one PRB includes X1 resource grids, where X1 is an integer greater than 1. For example, X1 is 12. The resource that can be used for data transmission may be some or all resources in a system frequency resource, or may be some or all resources in a bandwidth resource. This is not limited in the present disclosure. A bandwidth of the resource that can be used for data transmission may be referred to as X2 PRBs, where X2 is an integer greater than or equal to 1. PRBs in the resource that can be used for data transmission may be sequentially numbered from X3 to X3+X2−1 in ascending order of frequencies, to obtain number values of the PRBs. X3 is an integer. For example, X3 is equal to 0. The term "number value" may also be referred to as an "identifier" or an "index" in this embodiment of the present disclosure.

In the resource that can be used for data transmission, one PRB corresponds to one VRB. The VRB may include a localized VRB or a distributed VRB. The localized VRB is directly mapped to a PRB. To be specific, an index of a PRB corresponding to a VRB whose index is $n_{VRB}$ is $n_{PRB}$ where $n_{PRB}=n_{VRB}$. The distributed VRB is mapped to a PRB according to a specific rule. The rule may be a mapping method commonly used by a person skilled in the art. For example, the mapping method may be a mapping method for an LTE system in a 3GPP standard protocol.

A unit of the time domain resource may be a symbol, a slot, a mini-slot, a subframe, a frame, or another time unit commonly used in the art. Time units corresponding to different subcarrier spacings may have different lengths. Using the symbol as an example, if a first subcarrier spacing is $\Delta f$, and a second subcarrier spacing is $k \times \Delta f$, a sum of symbol lengths corresponding to k second subcarrier spacings may be equal to a symbol length corresponding to one first subcarrier spacing, where k is an integer greater than or equal to 2.

In the time-frequency resource, one subcarrier in frequency domain and one symbol in time domain may correspond to one RE.

With development of a wireless communications technology, a multiple-antenna technology is introduced to improve reliability of data transmission and/or improve a data transmission rate. In a multiple-antenna system, the gNB and the UE may perform data transmission by using a plurality of antenna ports. Each of the plurality of antenna ports may be considered as a spatial layer, and each spatial layer corresponds to one air interface resource. Therefore, in the multiple-antenna system, the gNB and the UE may transmit data at a plurality of spatial layers. When same data is transmitted at the plurality of spatial layers, the reliability of the data transmission can be improved. When different data is transmitted at the plurality of spatial layers, the data transmission rate can be improved. Because the antenna ports transmit data independently, when reference signals are set, a corresponding reference signal may be set for each antenna port.

For one UE, a resource for transmitting a CSI-RS of the UE may be configured in a bandwidth resource of the UE, and a numerology used when the CSI-RS of the UE is transmitted may be a numerology of the bandwidth resource of the UE. The numerology of the bandwidth resource of the UE may be used to transmit information carried on a data channel of the UE, may be used to transmit information carried on a control channel of the UE, and may further be used to transmit a reference signal of the UE. The data channel may be a physical layer data channel, and the control channel may be a physical layer control channel. In some or all resources in the bandwidth resource of the UE, an RE used to transmit the CSI-RS may be determined based on a CSI-RS pattern.

Figure 5:
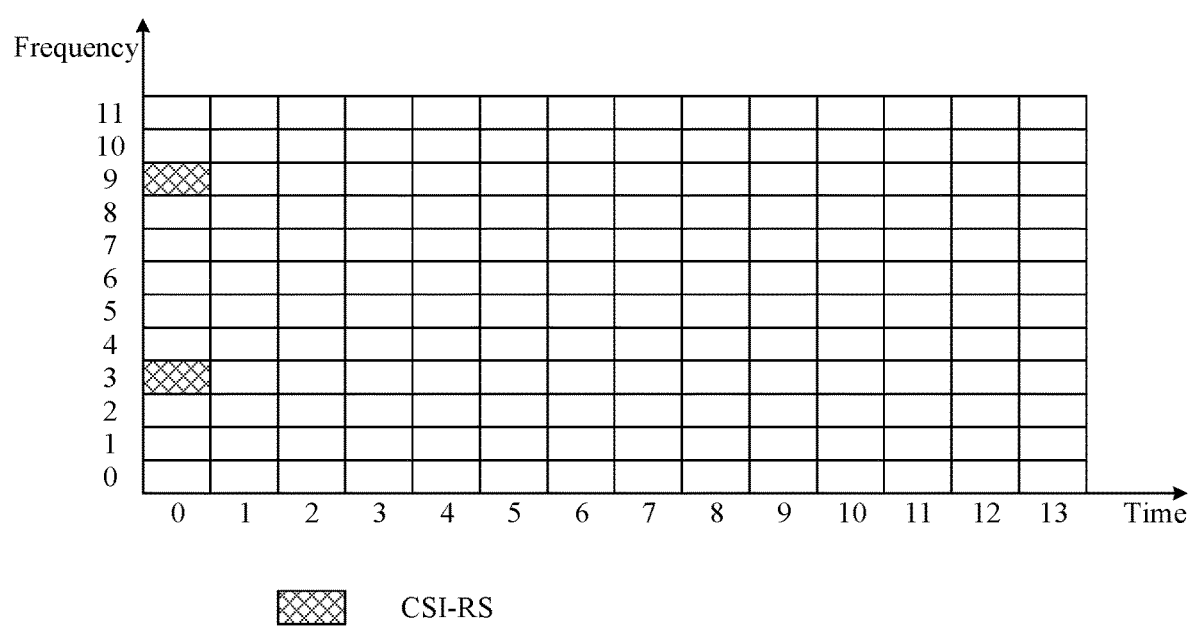
FIG. 5 is an example of a diagram of a CSI-RS pattern corresponding to two antenna ports according to an embodiment of the present disclosure.

FIG. 5 shows an example of a CSI-RS pattern corresponding to two-antenna ports. As shown in FIG. 5, a resource granularity corresponding to the CSI-RS pattern includes 12 subcarriers and 14 symbols. Correspondingly, the resource granularity includes 168 REs, and one RE corresponds to one subcarrier and one symbol. In the CSI-RS pattern shown in FIG. 5, two REs in the resource granularity corresponding to the 12 subcarriers and the 14 symbols are set to be REs used to transmit the CSI-RS. A first RE is an RE (3, 0), where 3 indicates an index of a subcarrier on which the RE is located, and 0 indicates an index of a symbol on which the RE is located. A second RE is an RE (9, 0), where 9 indicates an index of a subcarrier on which the RE is located, and 0 indicates an index of a symbol on which the RE is located.

In the resource that can be used for data transmission, when the CSI-RS pattern is used to determine the RE for transmitting the CSI-RS, the RE used to transmit the CSI-RS is determined by using a resource granularity corresponding to the CSI-RS pattern as a unit. For example, if the CSI-RS pattern is the CSI-RS pattern shown in FIG. 5, in the resource that can be used for data transmission, and in a resource corresponding to every 12 subcarriers and 14 symbols, the RE (3, 0) and the RE (9, 0) are REs used to transmit the CSI-RS.

In an actual application, the resource granularity corresponding to the CSI-RS pattern may include any positive integer quantity of subcarriers and any positive integer quantity of symbols. This is not limited in the present disclosure. In an actual application, any RE in the resource granularity corresponding to the CSI-RS pattern may be configured as the RE used to transmit the CSI-RS. This is not limited in the present disclosure. For example, one RB includes 12 subcarriers in frequency domain. Table 1 shows a CSI-RS pattern configured in a resource granularity corresponding to one RB and 14 symbols. Based on the CSI-RS pattern, in the resource granularity corresponding to one RB and 14 symbols, the RE used to transmit the CSI-RS is an RE. (k, l), where, $k=\bar{k}+k'$ and $l=\bar{l}+l'$. Values of $\bar{k}$, $k'$, $\bar{l}$, and $l'$ are shown in Table 1. k is greater than or equal to 0 and less than or equal to 12 minus 1, in other words, k is greater than or equal to 0 and less than or equal to 11; l is greater than or equal to 0 and less than or equal to 14 minus 1, in other words, l is greater than or equal to 0 and less than or equal to 13.

As shown in Table 1, in a resource that can be used to transmit the CSI-RS, and in every 14 symbols in time domain and one of every 1/ρ RBs in frequency domain, there are $N_{RE}$ REs used to transmit the CSI-RS in total, where $N_{RE}$ is a quantity of possible values of ($\bar{k}+k'$, $\bar{l}+l'$) and the RE used to transmit the CSI-RS is an RE ($\bar{k}+k'$, $\bar{l}+l'$).

For example, as shown in the second row of Table 1, for ($\bar{k}+k'$, $\bar{l}+l'$) corresponding to one antenna port, there is one possible value ($k_0$, $l_0$) in total. When a density is 1, in the resource that can be used to transmit the CSI-RS, and in every 14 symbols in time domain and every one RB in frequency domain, there is one RE used to transmit the CSI-RS in total, and the RE used to transmit the CSI-RS is an RE ($k_0$, $l_0$).

For example, as shown in the second row of Table 1, for ($\bar{k}+k'$, $\bar{l}+l'$) corresponding to one antenna port, there is one possible value ($k_0$, $l_0$) in total. When a density is 0.5, in the resource that can be used to transmit the CSI-RS, and in every 14 symbols in time domain and one of every two RBs in frequency domain, there is one RE used to transmit the CSI-RS in total, and the RE used to transmit the CSI-RS is an RE ($k_0$, $l_0$).

For example, as shown in the third row in Table 1, for ($\bar{k}+k'$, $\bar{l}+l'$) corresponding to two antenna ports, there are two possible values ($k_0$, $l_0$) and ($k_0+1$, $l_0$) in total. When a density is 1, in the resource that can be used to transmit the CSI-RS, and in every 14 symbols in time domain and every one RB in frequency domain, there are two REs used to transmit the CSI-RS in total, and the REs used to transmit the CSI-RS are an RE ($k_0$, $l_0$) and an RE ($k_0+1$, $l_0$).

For example, as shown in the third row in Table 1, for ($\bar{k}k'+k'$, $\bar{l}+l'$) corresponding to two antenna ports, there are two possible values ($k_0$, $l_0$) and ($k_0+1$, $l_0$) total. When a density is 0.5, in the resource that can be used to transmit the CSI-RS, and in every 14 symbols in time domain and one of every two RBs in frequency domain, there are two REs used to transmit the CSI-RS in total, and the REs used to transmit the CSI-RS are an RE ($k_0$, $l_0$) and an RE ($k_0+1$, $l_0$).

TABLE 1

| Quantity of antenna ports | Density ρ | ($\bar{k}$, $\bar{l}$) | k' | l' |
|---|---|---|---|---|
| 1 | 1, 0.5 | ($k_0$, $l_0$) | 0 | 0 |
| 2 | 1, 0.5 | ($k_0$, $l_0$) | 0, 1 | 0 |
| 4 | 1 | ($k_0$, $l_0$), ($k_0 + 2$, $l_0$) | 0, 1 | 0 |
| 4 | 1 | ($k_0$, $l_0$), ($k_0$, $l_1$) | 0, 1 | 0 |
| 4 | 1 | ($k_0$, $l_0$) | 0, 1 | 0, 1 |
| 8 | 1 | ($k_0$, $l_0$), ($k_1$, $l_0$), ($k_2$, $l_0$), ($k_3$, $l_0$) | 0, 1 | 0 |
| 8 | 1 | ($k_0$, $l_0$), ($k_1$, $l_0$), ($k_0$, $l_0 + 1$), ($k_1$, $l_0 + 1$) | 0, 1 | 0 |
| 8 | 1 | ($k_0$, $l_0$), ($k_1$, $l_0$) | 0, 1 | 0, 1 |

According to the resource configuration method provided in this embodiment of the present disclosure, a data conflict between different UEs can be resolved. Using FIG. 3 as an example, in the slot n, the data of the first UE may conflict with the CSI-RS of the second UE. To resolve the conflict, reserved REs may be configured for the first UE in the bandwidth resource of the first UE. The reserved REs include an RE used to transmit the second CSI-RS, and the reserved REs are included in a reserved resource configured for the first UE. The gNB does not perform data transmission with the first UE on the reserved resource configured for the first UE, that is, the gNB and the first UE perform data transmission on all or some REs other than the reserved resource configured for the first UE. In this case, the data of the first UE does not conflict with the CSI-RS of the second UE. A numerology of the bandwidth resource of the first UE may be the same as or different from a numerology of the bandwidth resource of the second UE. This is not limited in the present disclosure.

Figure 6:
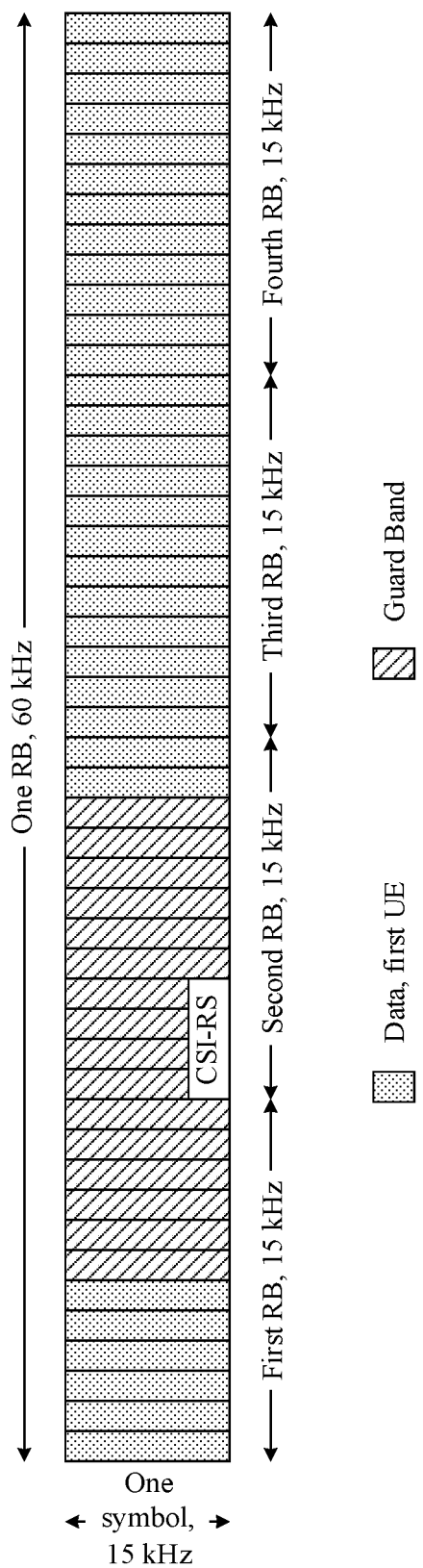
FIG. 6 is an example of a diagram of resolving a conflict between UEs with different parameters by using a resource configuration method according to an embodiment of the present disclosure.

FIG. 6 is a first example of a diagram of resolving a conflict between UEs with different numerologies by using a resource configuration method according to an embodiment of the present disclosure. As shown in FIG. 6, one RB includes 12 subcarriers. A subcarrier spacing of a bandwidth resource of a first UE is 15 kHz, a subcarrier spacing of a bandwidth resource of a second UE is 60 kHz, and a subcarrier spacing for transmitting a CSI-RS of the second UE is the subcarrier spacing of the bandwidth resource of the UE. A sum of widths of four subcarriers of 15 kHz is equal to a width of one subcarrier of 60 kHz, and a sum of four symbol lengths of 60 kHz is equal to one symbol length of 15 kHz. Based on a CSI-RS pattern of the second UE, the second UE may transmit the CSI-RS on one RE by using 60 kHz in a resource unit that corresponds to 15 kHz and that includes four RBs and one symbol.

Referring to FIG. 6, a resource unit may be configured for the first UE, and the resource unit includes four RBs in frequency domain and includes one symbol in time domain. In the resource unit, REs shown by oblique lines in FIG. 6 are configured as reserved REs, the reserved REs are included in a reserved resource, and the first UE and a gNB may perform data transmission on some or all resources other than the reserved resource. The reserved resource may also be referred to as a reserved resource of the first UE. For example, the first UE and the gNB may perform the data transmission on REs filled with dots that are shown in FIG. 6.

The reserved REs in the resource unit configured for the first UE may include an RE used to transmit the CSI-RS of the second UE. For example, one RE marked with CSI-RS in FIG. 6 may be used to transmit the CSI-RS of the second UE, and a subcarrier spacing of the RE is 60 kHz. Further, the reserved REs shown in FIG. 6 may further include a guard band between data of the first UE and the CSI-RS of the second UE. That is, a guard band is configured between the data of the first UE and the CSI-RS of the second UE, to reduce interference between different numerologies.

Figure 7:
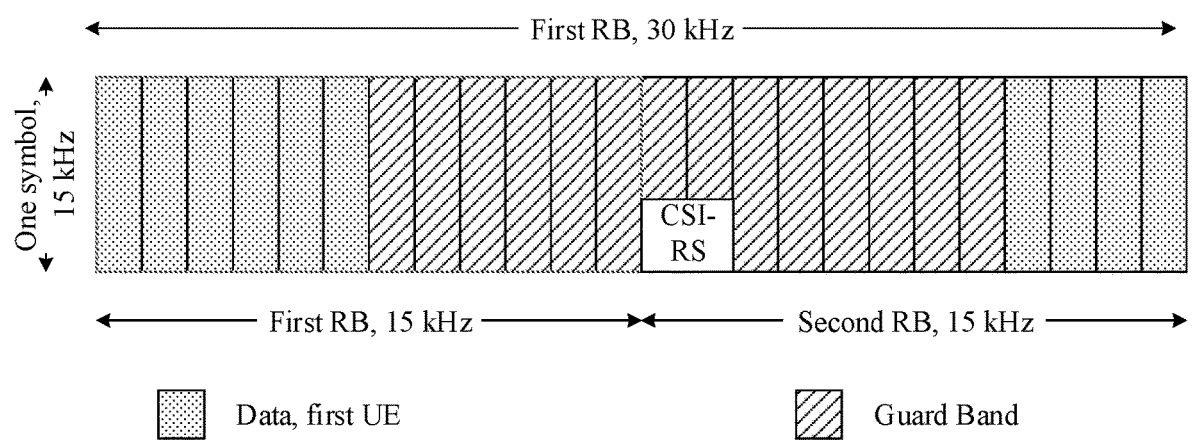
FIG. 7 is an example of a diagram of resolving a conflict between UEs with different parameters by using a resource configuration method according to an embodiment of the present disclosure.

FIG. 7 is a second example of a diagram of resolving a conflict between UEs with different numerologies by using a resource configuration method according to an embodiment of the present disclosure. As shown in FIG. 7, one RB includes 12 subcarriers. A subcarrier spacing of a bandwidth resource of a first UE is 15 kHz, a subcarrier spacing of a bandwidth resource of a second UE is 30 kHz, and a subcarrier spacing for transmitting a CSI-RS of the second UE is the subcarrier spacing of the bandwidth resource of the UE. A sum of widths of two subcarriers of 15 kHz is equal to a width of one subcarrier of 30 kHz, and a sum of two symbol lengths of 30 kHz is equal to one symbol length of 15 kHz. Based on a CSI-RS pattern of the second UE, the second UE may transmit the CSI-RS on one RE by using 30 kHz in a resource unit that corresponds to 15 kHz and that includes two RBs and one symbol.

Referring to FIG. 7, a resource unit may be configured for the first UE. The resource unit includes two RBs in frequency domain, and includes one symbol in time domain. In the resource unit, REs shown by oblique lines in FIG. 7 are configured as reserved REs, the reserved REs are included in a reserved resource, and the first UE and a gNB may perform data transmission on some or all resources other than the reserved resource. The reserved resource may also be referred to as a reserved resource of the first UE. For example, the first UE and the gNB may perform the data transmission on REs filled with dots that are shown in FIG. 7.

The reserved REs in the resource unit configured for the first UE may include an RE used to transmit the CSI-RS of the second UE. For example, one RE marked with CSI-RS in FIG. 7 may be used to transmit the CSI-RS of the second UE, and a subcarrier spacing of the RE is 30 kHz. As shown in FIG. 7, the reserved REs may further include a guard band between data of the first UE and the CSI-RS of the second UE. That is, a guard band is configured between the data of the first UE and the CSI-RS of the second UE, to reduce interference between different numerologies.

Figure 8:
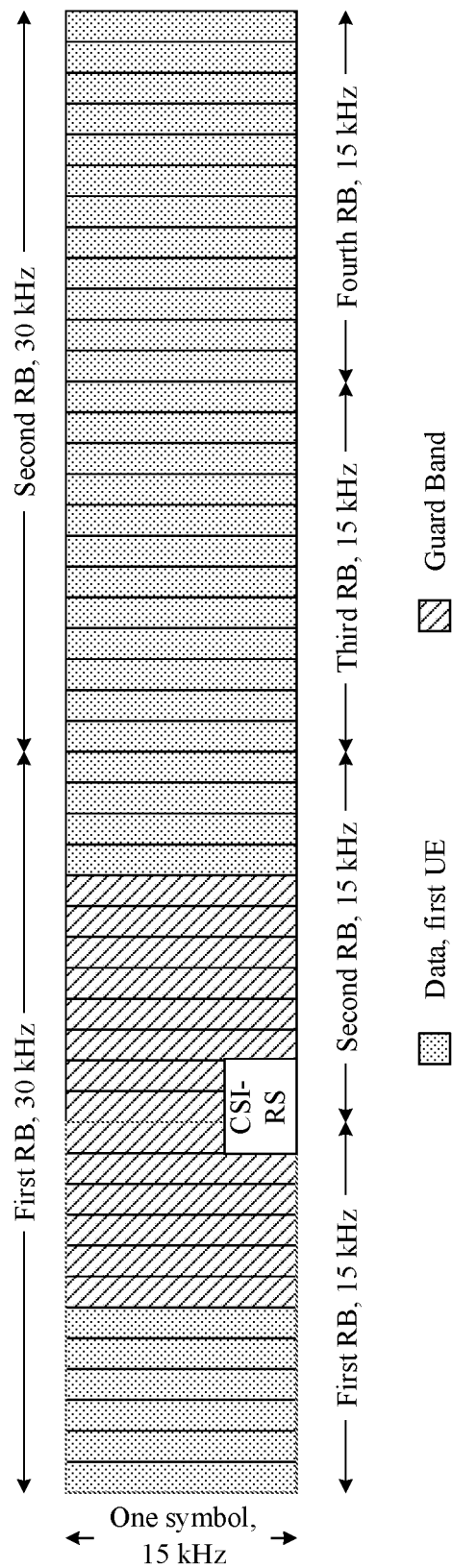
FIG. 8 is an example of a diagram of resolving a conflict between UEs with different parameters by using a resource configuration method according to an embodiment of the present disclosure.

FIG. 8 is a third example of a diagram of resolving a conflict between UEs with different numerologies by using a resource configuration method according to an embodiment of the present disclosure. As shown in FIG. 8, one RB includes 12 subcarriers. A subcarrier spacing of a bandwidth resource of a first UE is 15 kHz, a subcarrier spacing of a bandwidth resource of a second UE is 30 kHz, and a subcarrier spacing for transmitting a CSI-RS of the second UE is the subcarrier spacing of the bandwidth resource of the UE. A sum of widths of two subcarriers of 15 kHz is equal to a width of one subcarrier of 30 kHz, and a sum of two symbol lengths of 30 kHz is equal to one symbol length of 15 kHz. Based on a CSI-RS pattern of the second UE, the second UE may transmit the CSI-RS on one RE by using 30 kHz in a resource unit that corresponds to 15 kHz and that includes four RBs and one symbol.

Referring to FIG. 8, a resource unit may be configured for the first UE, and the resource unit includes four RBs in frequency domain and includes one symbol in time domain. In the resource unit, REs shown by oblique lines in FIG. 8 are configured as reserved REs, the reserved REs are included in a reserved resource, and the first UE and a gNB may perform data transmission on some or all of resources other than the reserved resource. The reserved resource may also be referred to as a reserved resource of the first UE. For example, the first UE and the gNB may perform the data transmission on REs filled with dots that are shown in FIG. 8.

The reserved REs in the resource unit configured for the first UE may include an RE used to transmit the CSI-RS of the second UE. For example, one RE marked with CSI-RS in FIG. 8 may be used to transmit the CSI-RS of the second UE, and a subcarrier spacing of the RE is 30 kHz. As shown in FIG. 8, the reserved REs may further include a guard band between data of the first UE and the CSI-RS of the second UE. That is, a guard band is configured between the data of the first UE and the CSI-RS of the second UE, to reduce interference between different numerologies.

Figure 9:
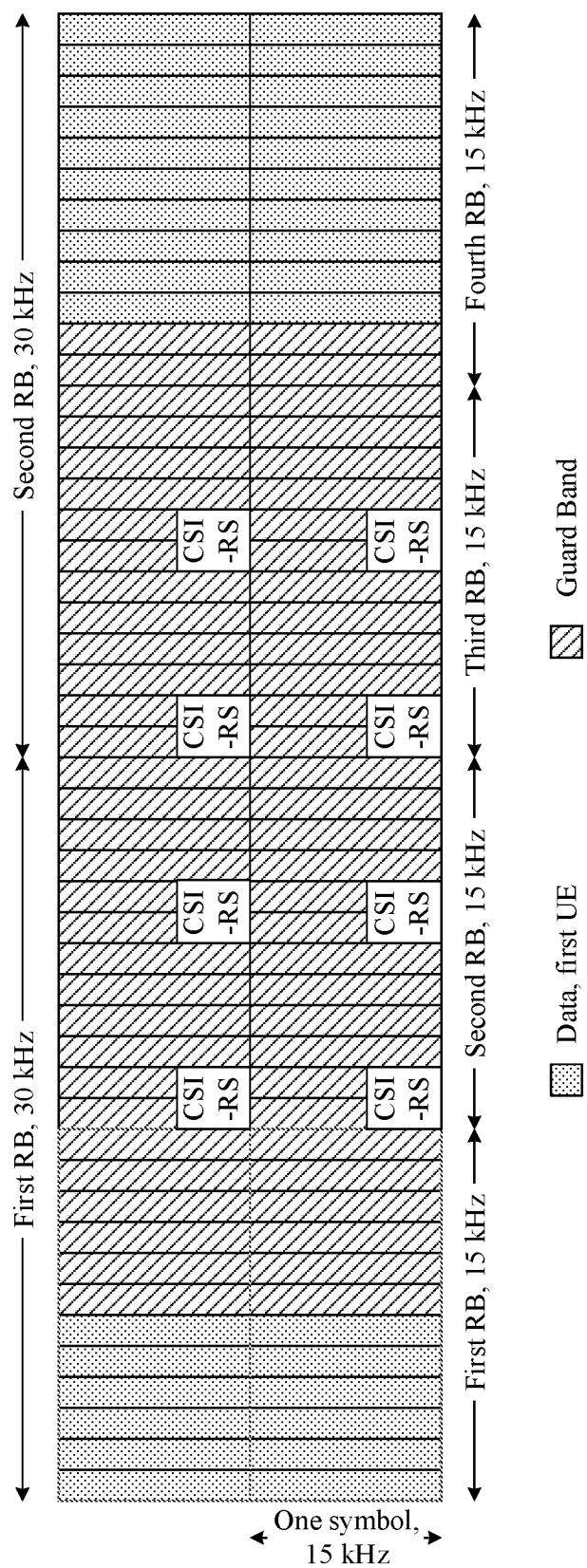
FIG. 9 is an example of a diagram of resolving a conflict between UEs with different parameters by using a resource configuration method according to an embodiment of the present disclosure.

FIG. 9 is a fourth example of a diagram of resolving a conflict between UEs with different numerologies by using a resource configuration method according to an embodiment of the present disclosure. As shown in FIG. 9, one RB includes 12 subcarriers. A subcarrier spacing of a bandwidth resource of a first UE is 15 kHz, a subcarrier spacing of a bandwidth resource of a second UE is 30 kHz, and a subcarrier spacing for transmitting a CSI-RS of the second UE is the subcarrier spacing of the bandwidth resource of the UE. A sum of widths of two subcarriers of 15 kHz is equal to a width of one subcarrier of 30 kHz, and a sum of two symbol lengths of 30 kHz is equal to one symbol length of 15 kHz. Based on a CSI-RS pattern of the second UE, the second UE may transmit the CSI-RS on eight REs by using 30 kHz in a resource unit that corresponds to 15 kHz and that includes four RBs and two symbols.

Referring to FIG. 9, a resource unit may be configured for the first UE, and the resource unit includes four RBs in frequency domain and includes two symbols in time domain. In the resource unit, REs shown by oblique lines in FIG. 9 are configured as reserved REs, the reserved REs are included in a reserved resource, and the first UE and a gNB may perform data transmission on some or all resources other than the reserved resource. The reserved resource may also be referred to as a reserved resource of the first UE. For example, the first UE and the gNB may perform the data transmission on REs filled with dots that are shown in FIG. 9.

The reserved REs in the resource unit configured for the first UE may include an RE used to transmit the CSI-RS of the second UE. For example, eight REs marked with CSI-RS in FIG. 9 may be used to transmit the CSI-RS of the second UE, and a subcarrier spacing of the RE is 30 kHz. As shown in FIG. 9, the reserved REs may further include a guard band between data of the first UE and the CSI-RS of the second UE. That is, a guard band is configured between the data of the first UE and the CSI-RS of the second UE, to reduce interference between different numerologies.

A method similar to the foregoing method may also be applied to a conflict between UEs with a same numerology. In this case, a guard band may or may not be configured between data of a first UE and a CSI-RS of a second UE. This is not limited in the present disclosure.

In this embodiment of the present disclosure, on a reserved resource configured for a UE, the gNB may perform data transmission with another UE, or may not perform data transmission. This is not limited in the present disclosure.

In the resource configuration method provided in this embodiment of the present disclosure, the reserved RE may be determined in the resource unit based on a first method for determining a reserved RE. In the first method for determining a reserved RE, the gNB and the UE may determine the reserved RE in the resource unit based on a reserved-RE pattern.

In the first method for determining a reserved RE, when the gNB and the UE determine the reserved RE in the resource unit based on the reserved-RE pattern, a resource granularity corresponding to the reserved-RE pattern is one resource unit. In one resource unit, several REs may be configured as reserved REs. This may also be described as follows: In one resource unit, a reserved RE is in y1 symbols of the resource unit based on the reserved-RE pattern, where y1 is an integer greater than or equal to 1 and less than or equal to Y, and Y is a quantity of symbols included in the reserved resource. In the y1 symbols, REs corresponding to several subcarriers may be configured as reserved REs.

In the method provided in this embodiment of the present disclosure, a subcarrier spacing corresponding to the resource unit configured for the UE may be the same as a subcarrier spacing of a bandwidth resource of the UE, or may be different from the subcarrier spacing corresponding to the bandwidth resource of the UE. This is not limited in the present disclosure. The subcarrier spacing corresponding to the resource unit may also be described as a subcarrier spacing corresponding to an RB included in the resource unit, a subcarrier spacing corresponding to a symbol included in the resource unit, or a subcarrier spacing of an RE included in the resource unit. When the subcarrier spacing corresponding to the resource unit configured for the UE is the same as the subcarrier spacing corresponding to the bandwidth resource of the UE, a quantity of numerologies maintained by the UE can be reduced, to reduce implementation complexity of the UE. When the subcarrier spacing corresponding to the resource unit configured for the UE is different from the subcarrier spacing corresponding to the bandwidth resource of the UE, the base station may flexibly configure the subcarrier spacing of the resource unit based on a requirement of the base station for using the reserved resource, thereby reducing signaling overheads. For example, in FIG. 6, the base station may transmit the CSI-RS of the second UE on the reserved resource of the first UE, and a subcarrier spacing corresponding to the reserved resource configured for the first UE may be the subcarrier spacing of the CSI-RS of the second UE.

In one embodiment, the subcarrier spacing corresponding to the resource unit configured for the UE is a minimum subcarrier spacing supported by a current frequency band. For example, for a frequency band below 6 GHz, a supported minimum subcarrier spacing is 15 kHz. For a frequency band above 6 GHz, a supported minimum subcarrier spacing is 60 kHz.

In one embodiment, the gNB may further send signaling to the UE, to indicate, by using the signaling, the subcarrier spacing corresponding to the resource unit configured for the UE. The signaling may also be referred to as resource unit subcarrier spacing configuration signaling.

In one embodiment, the subcarrier spacing corresponding to the resource unit configured for the UE may be the same as a subcarrier spacing used to transmit a system message.

If the gNB indicates the at least one of X and Y to the UE by using the system message, the subcarrier spacing corresponding to the resource unit configured for the UE is the same as the subcarrier spacing used to transmit the system message. X is a quantity of RBs included in the resource unit in frequency domain, and Y is a quantity of symbols included in the resource unit in time domain.

Figure 10:
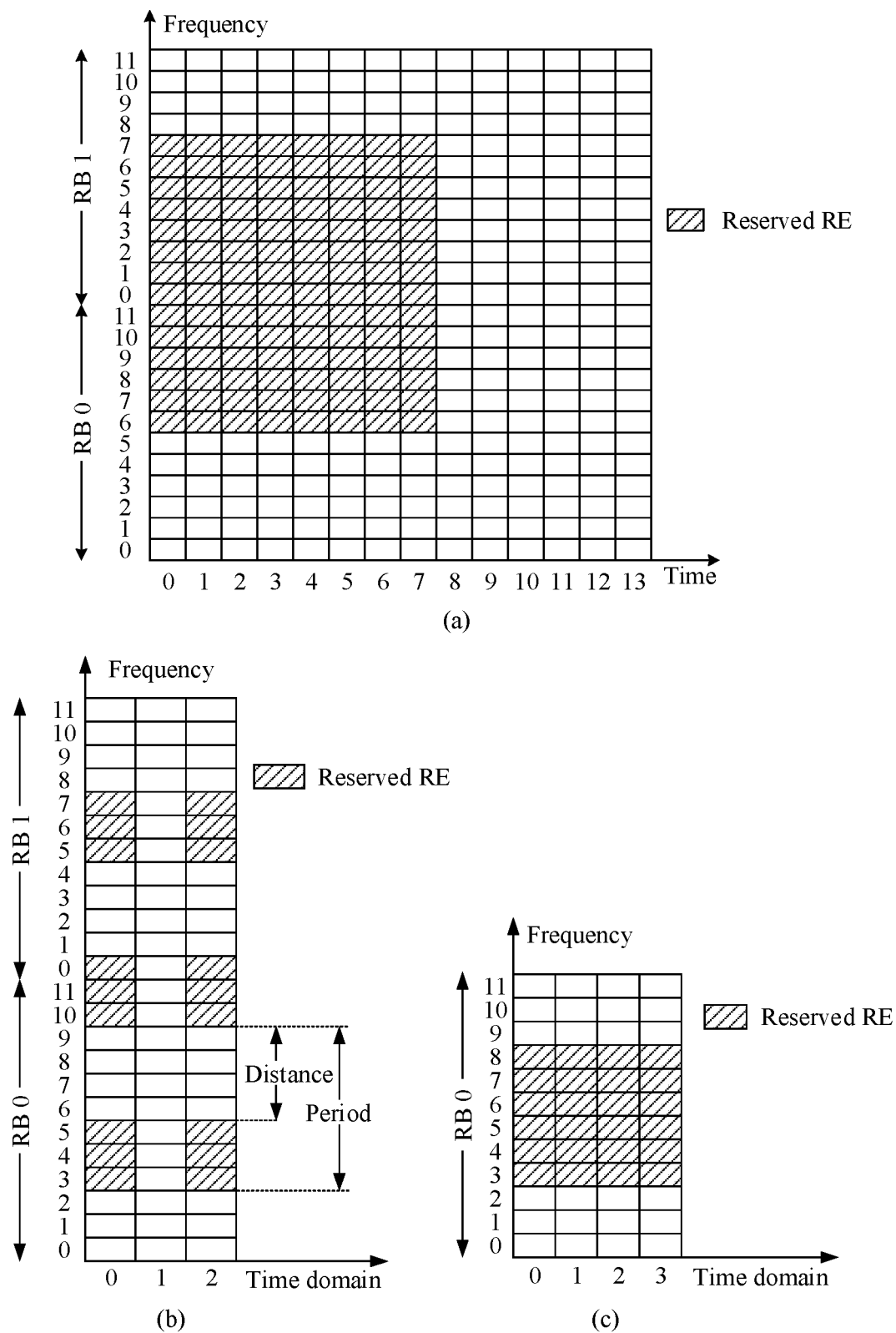
FIG. 10 is an example of a diagram of a reserved-RE pattern according to an embodiment of the present disclosure.

In the first method for determining a reserved RE, based on the reserved-RE pattern, when y1 is greater than 1, reserved REs in different symbols may correspond to a same subcarrier. FIG. 10 shows a first possible example of a reserved-RE pattern.

As shown in FIG. 10(a), a resource unit includes two RBs in frequency domain, and includes 14 symbols in time domain, and one RB includes a total of 12 subcarriers: a subcarrier 0 to a subcarrier 11. In the resource unit, reserved REs may be configured in a symbol 0 to a symbol 7. The reserved REs in the symbol 0 to the symbol 7 correspond to same subcarriers, namely, a subcarrier 6 of an RB 0 to a subcarrier 7 of an RB 1.

As shown in FIG. 10(b), a resource unit includes two RBs in frequency domain, and includes three symbols in time domain, and one RB includes a total of 12 subcarriers: a subcarrier 0 to a subcarrier 11. In the resource unit, reserved REs are configured in a symbol 0 and a symbol 2, and the reserved REs in the symbol 0 and the symbol 2 correspond to same subcarriers, namely, a subcarrier 3 to a subcarrier 5 of an RB 0, a subcarrier 10 and a subcarrier 11 of the RB 0, a subcarrier 0 of an RB 1, and a subcarrier 5 to a subcarrier 7 of the RB 1.

As shown in FIG. 10(c), a resource unit includes one RB in frequency domain, and includes four symbols in time domain, and one RB includes a total of 12 subcarriers: a subcarrier 0 to a subcarrier 11. In the resource unit, reserved REs may be configured in a symbol 0 to a symbol 3, and the reserved REs in the symbols correspond to same subcarriers, namely, a subcarrier 3 to a subcarrier 7 of an RB 0.

Figure 11:
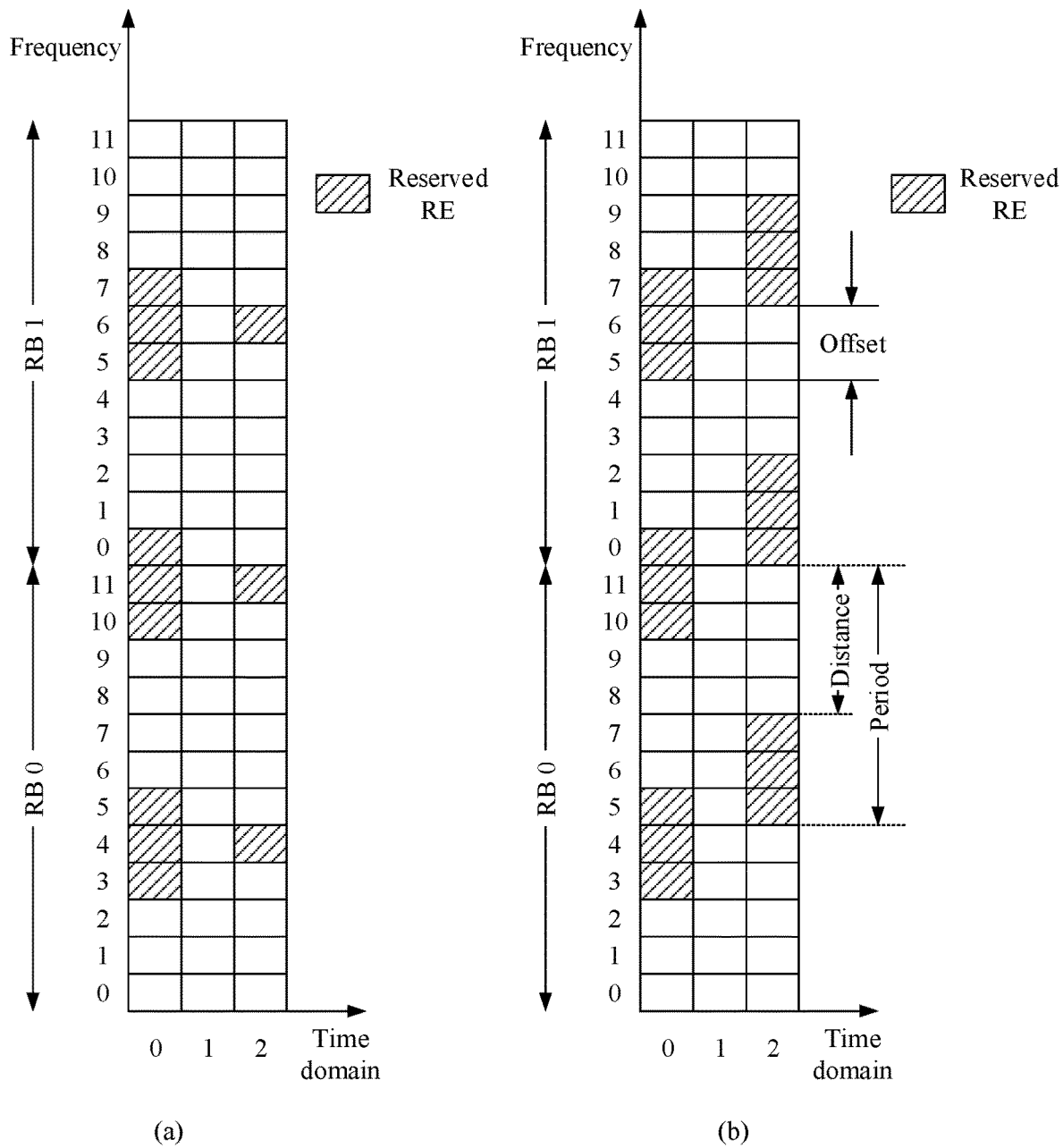
FIG. 11 is an example of a diagram of a reserved-RE pattern according to an embodiment of the present disclosure.

In the first method for determining a reserved RE, when y1 is greater than 1, subcarriers corresponding to reserved REs in different symbols may be different. The method may also be described as follows: When y1 is greater than 1, reserved REs in at least two of the y1 symbols corresponds to different subcarriers. FIG. 11 shows a second possible example of a reserved-RE pattern. As shown in FIG. 11, a resource unit includes two RBs in frequency domain, and includes three symbols in time domain, and one RB includes a total of 12 subcarriers: a subcarrier 0 to a subcarrier 11.

In one embodiment, in they 1 symbols, a quantity of subcarriers corresponding to reserved REs in a symbol y2 is different from a quantity of subcarriers corresponding to reserved REs in a symbol y3, where y2 is an integer greater than or equal to 0 and less than or equal to y11, and y3 is an integer greater than or equal to 0 and less than or equal to y1−1. As shown in FIG. 11(a), in a resource unit, reserved REs may be configured in a symbol 0 and a symbol 2. In the symbol 0, subcarriers corresponding to the reserved REs are a subcarrier 3 to a subcarrier 5 of an RB 0, a subcarrier 10 and a subcarrier 11 of the RB 0, a subcarrier 0 of an RB 1, and a subcarrier 5 to a subcarrier 7 of the RB 1. In the symbol 2, subcarriers corresponding to the reserved REs are a subcarrier 4 and the subcarrier 11 of the RB 0, and a subcarrier 6 of the RB 1.

In one embodiment, in the y1 symbols, an offset of a subcarrier corresponding to a reserved RE in a symbol y2 relative to a subcarrier corresponding to a reserved RE in a symbol y3 is $\Delta_{offset}$, where a unit of $\Delta_{offset}$ is a quantity of subcarriers, y2 is an integer greater than or equal to 0 and less than or equal to y1=1, and y3 is an integer greater than or equal to 0 and less than or equal to y1−1. As shown in FIG. 11(b), a reserved RE in a symbol 0 corresponds to a subcarrier m in an RB n, and a reserved RE in a symbol 2 corresponds to a subcarrier m' in an RB n', where $$m' = (m + \Delta_{offset}) \bmod 12$$

and $$n' = \begin{cases} n, & m + \Delta_{offset} > 12 \\ n+1, & \text{otherwise} \end{cases},$$

where $$\Delta_{offset} = 2.$$

In the first method for determining a reserved RE, for a UE, a reserved-RE pattern may be configured for the UE, and the UE determines a reserved UE in a resource unit based on the reserved-RE pattern. For N UEs, a reserved-RE pattern corresponding to each UE may be configured, and reserved-RE patterns of any two of the N UEs may be the same or may be different, where N is an integer greater than or equal to 2. Alternatively, for the N UEs, a common reserved-RE pattern of the N UEs may be configured, in other words, reserved-RE patterns of the N UEs are the same. For example, the N UEs may be all UEs or some UEs in a cell.

In the first method for determining a reserved RE, the gNB may further send a reference signal indication and a reference signal configuration indication to the UE, to indicate the reserved RE configured by the gNB for the UE. The reference signal may be a CSI-RS, a demodulation reference signal (DMRS), or another reference signal. The UE receives the reference signal indication and the reference signal configuration indication, and determines, based on the reference signal configuration indication, the reserved-RE pattern in reference signal patterns corresponding to the reference signal indication. The determining the reserved-RE pattern in reference signal patterns corresponding to the reference signal indication may also be described as: determining the reserved-RE pattern in available reference signal patterns of a reference signal indicated by the reference signal indication. For example, if the reference signal indicated by the reference signal indication is a CSI-RS, the reference signal pattern corresponding to the reference signal indication is a CSI-RS pattern.

For example, a configuration of the reference signal pattern is similar to that shown in Table 1, and includes: a quantity of antenna ports, a density, ($\bar{k}'$, $\bar{l}$), k', and l'. Specific values of the parameters in the reference signal pattern may be the same as or different from those shown in Table 1. This is not limited in the present disclosure. The reference signal configuration indication is used to indicate the quantity of antenna ports, the density, and a resource mapping configuration. The resource mapping configuration includes ($\bar{k}$, $\bar{l}$), k' and l'. Alternatively, the gNB and the UE may determine the density based on a preconfiguration. In this case, the reference signal configuration indication may be used to indicate the quantity of antenna ports and the resource mapping configuration.

For example, the reference signal indication may also indicate a cell-specific reference signal (CRS). In this case, the reserved-RE pattern is one of available CRS patterns, and the available CRS patterns may be available CRS patterns in LTE. In the LTE, an actually used CRS pattern may be determined in the available CRS patterns based on the quantity of antenna ports and a first frequency offset. The reference signal configuration indication may be used to indicate the quantity of antenna ports and a first frequency domain offset. After receiving the reference signal indication and the reference signal configuration indication, the UE may determine the reserved-RE pattern in the available CRS patterns based on the quantity of antenna ports and the first frequency domain offset.

In the first method for determining a reserved RE, M available reserved-RE patterns may alternatively be configured for the UE, where M is a positive integer. The M available reserved-RE patterns may be configured for the gNB and the UE through preconfiguration. Alternatively, the gNB may send signaling to the UE, and configure the M available reserved-RE patterns for the UE by using the signaling. Further, the gNB may configure the reserved-RE pattern for the UE by using signaling. The reserved RE configured for the UE is included in the M available reserved REs. For example, one of the M available reserved-RE patterns may correspond to one reserved-RE pattern identifier. The gNB sends a reserved-RE pattern identifier to the UE. The UE receives the reserved-RE pattern identifier, and uses a reserved-RE pattern corresponding to the reserved-RE pattern identifier as the reserved-RE pattern of the UE.

In one embodiment, the M available reserved-RE patterns may correspond to at least one type of reference signal pattern. The M available reserved-RE patterns may be some or all patterns in the at least one type of reference signal pattern. The reference signal may be a CSI-RS, a cell-specific reference signal (CRS), a demodulation reference signal (DMRS), or another reference signal.

The M available reserved-RE patterns may be some or all patterns in one type of reference signal pattern. For example, the M available reserved-RE patterns may be some or all of CSI-RS patterns. The CSI-RS pattern may be a CSI-RS pattern shown in Table 1. Further, for a reference signal, one reference signal pattern corresponds to one pattern identifier. The gNB may send signaling to the UE, where the signaling is used to indicate M pattern identifiers. The UE receives the signaling, and uses M reference signal patterns corresponding to the M pattern identifiers as the M available reserved-RE patterns.

The M available reserved-RE patterns may be some or all of patterns of a reference signal A. The reference signal A may be any one of a CSI-RS, a CRS, and a DMRS. In this solution, the gNB may send signaling to the UE, and the signaling includes the reference signal indication. After receiving the signaling, the UE uses some or all of reference signal patterns corresponding to the reference signal indication as the M available reserved-RE patterns. Further, for the reference signal A, one reference signal pattern corresponds to one pattern identifier. The gNB may send signaling to the UE. The signaling is used to indicate M pattern identifiers. The UE receives the signaling, and uses M reference signal patterns corresponding to the M pattern identifiers as the M available reserved-RE patterns.

The M available reserved-RE patterns may be some or all patterns in a combined pattern, and the combined pattern includes a plurality of reference signal patterns. Further, one pattern in the combined pattern corresponds to one identifier. The gNB may send signaling to the UE. The signaling is used to indicate M pattern identifiers. The UE receives the signaling, and uses M reference signal patterns corresponding to the M pattern identifiers as the M available reserved-RE patterns. For example, the combined pattern may include some or all of CRS patterns, some or all of CSI-RS patterns, and some or all of DMRS patterns.

In the first method for determining a reserved RE, the gNB may further send a time domain offset indication and/or a second frequency domain offset indication of the reserved-RE pattern. The UE determines a reserved-RE pattern A based on any method in the first method for determining a reserved RE, and determines, based on the reserved-RE pattern A and the time domain offset indication and/or the second frequency domain offset indication, the reserved-RE pattern configured by the gNB for the UE. An offset of the reserved-RE pattern configured by the gNB for the UE relative to the reserved-RE pattern in time domain is a value indicated by the time domain offset indication, and an offset of the reserved-RE pattern configured by the gNB for the UE relative to the reserved-RE pattern in frequency domain is a value indicated by the second frequency domain offset indication.

In this embodiment of the present disclosure, configuring a reserved RE in a resource unit is equivalent to configuring a non-reserved RE in the resource unit. In the resource unit, an RE other than the non-reserved RE is the reserved RE.

In the resource configuration method provided in this embodiment of the present disclosure, the reserved RE may be determined in the resource unit based on a second method for determining a reserved RE. In the second method for determining a reserved RE, the gNB configures the reserved RE for the UE through signaling notification. The gNB sends reserved-RE configuration information to the UE. The reserved-RE configuration information is used to indicate a reserved RE configured by the gNB for the UE in the resource unit. The UE receives the reserved-RE configuration information, and determines the reserved RE in the resource unit based on the information. The reserved-RE configuration information may also be referred to as reserved-RE configuration signaling, first information, or another name. This is not limited in the present disclosure.

The reserved-RE configuration information may be any one of the following first reserved-RE configuration information to third reserved-RE configuration information:

First Reserved-RE Configuration Information:

The first reserved-RE configuration information includes P RE indexes. In the resource unit, P REs corresponding to the P RE indexes are reserved REs, where P is a positive integer. For any RE index in the P RE indexes, the RE index includes a frequency index and a time domain index of an RE corresponding to the RE index.

In this embodiment of the present disclosure, the frequency index of the RE may also be referred to as a frequency number, a subcarrier number, a subcarrier index, or another name. The time domain index of the RE may also be referred to as a time domain number, a symbol number, or another name.

In this embodiment of the present disclosure, one resource unit includes X RBs in frequency domain, and one RB includes F subcarriers, where X and F are positive integers. In the resource unit, REs in the resource unit may be numbered in frequency domain by using a first frequency numbering scheme, that is, a subcarrier index of an RE includes an RB index I_RB and a subcarrier index I_SC of an RB, where I_RB is an integer greater than or equal to 0 and less than X, and I_SC is an integer greater than or equal to 0 and less than F. In the resource unit, REs in the resource unit may alternatively be numbered in frequency domain by using a second frequency numbering scheme, that is, a subcarrier index of an RE is a combined subcarrier index I_CSC, where I_CSC is an integer, and I_CSC is greater than or equal to 0 and less than a value obtained by multiplying X by F.

In this embodiment of the present disclosure, one resource unit includes Y symbols in time domain, where Y is a positive integer. In the resource unit, a symbol index of an RE is I_symb, where I_symb is an integer greater than or equal to 0 and less than Y.

Second Reserved-RE Configuration Information:

The second reserved-RE configuration information includes Z subcarrier set indications and/or W symbol set indications, where Z and W are positive integers. When the reserved-RE configuration information includes the Z subcarrier set indications, in all symbols of the resource unit, REs corresponding to subcarriers indicated by the Z subcarrier set indications are reserved REs. When the reserved-RE configuration information includes the W symbol set indications, in all subcarriers of the resource unit, REs corresponding to symbols indicated by the W symbol set indications are reserved REs. When the reserved-RE configuration information includes the Z subcarrier set indications and the W symbol set indications, in the resource unit and in symbols indicated by the W symbol set indications, REs corresponding to subcarriers indicated by the Z subcarrier set indications are reserved REs.

Any one of the Z subcarrier set indications may be the following subcarrier set indication A1 or subcarrier set indication A2:

Subcarrier Set Indication A1:

The subcarrier set indication A1 indicates a start subcarrier index and a quantity of consecutively allocated subcarriers, and is used to indicate one group of subcarriers. A numbering scheme corresponding to the start subcarrier index may be the first frequency numbering scheme, or may be the second frequency numbering scheme. This is not limited in the present disclosure.

Subcarrier Set Indication A2:

The subcarrier set indication A2 indicates a start subcarrier index and an end subcarrier index, and is used to indicate one group of subcarriers. Numbering schemes corresponding to the start subcarrier index and the end subcarrier index may be the first frequency numbering scheme, or may be the second frequency numbering scheme. This is not limited in the present disclosure.

The Z subcarrier set indications may alternatively be the following subcarrier set indication A3 or subcarrier set indication A4:

Subcarrier Set Indication A3:

The subcarrier set indication A3 includes K information bits, and one of the K information bits corresponds to k1 subcarriers in the resource unit, where K and k1 are positive integers. For example, K is equal to a quantity of subcarriers included in the resource unit, and k1 is equal to 1. For an information bit in the K information bits, if a value of the information bit is t1, a subcarrier corresponding to the information bit includes a reserved RE; or if a value of the information bit is not t1 or is t2, a subcarrier corresponding to the information bit does not include a reserved RE. t1 and t2 are integers. For example, t1 is equal to 1.

It should be noted that the subcarrier set indication A3 may be used to indicate any one of Z subcarrier sets.

Subcarrier Set Indication A4:

The subcarrier set indication A4 includes a start subcarrier set indication and a period of a subcarrier set. A unit of the period of the subcarrier set is a quantity of subcarriers, and the period of the subcarrier set may further be determined based on a distance between two adjacent subcarrier sets in one symbol. The start subcarrier set indication may be any one of the subcarrier set indication A1 to the subcarrier set indication A3.

Any one of the W symbol set indications may be the following symbol set indication B1 or symbol set indication B2:

Symbol Set Indication B1:

The symbol set indication B1 indicates a start symbol index and a quantity of consecutively allocated symbols, and is used to indicate one group of symbols.

Symbol Set Indication B2:

The symbol set indication B2 indicates a start symbol index and an end symbol index, and is used to indicate one group of symbols.

The W symbol set indications may be the following symbol set indication B3 or symbol set indication B4:

Symbol Set Indication B3:

The symbol set indication B3 includes L information bits, and one of the L information bits corresponds to u symbols in the resource unit, where L and u are positive integers. For example, L is equal to a quantity of symbols included in the resource unit, where u is equal to 1. For an information bit in the L information bits, if a value of the information bit is t1, a symbol corresponding to the information bit includes a reserved RE; or if a value of the information bit is not t1 or is t2, a symbol corresponding to the information bit does not include a reserved RE. t1 and t2 are integers. For example, t1 is equal to 1.

It should be noted that the symbol set indication B3 may be used to indicate any one of the foregoing W symbol sets.

Symbol Set Indication B4:

The symbol set indication B4 includes a start symbol set indication and a period of a symbol set. A unit of the period of the symbol set is a quantity of symbols, and the period of the symbol set may further be determined based on a distance between two adjacent symbol sets in which reserved REs are located. The start symbol set indication may be any one of the symbol set indication B1 to the symbol set indication B3.

Further, the second reserved-RE configuration information may further include an offset value indication, used to indicate an offset between subcarriers corresponding to reserved REs in a symbol set h1 and a symbol set h2. h1 and h2 are integers. h1 and h2 may be adjacent symbol sets. The gNB may further send signaling to the UE, to indicate a distance between h1 and h2 in time domain.

The gNB sends the second reserved-RE configuration information to the UE. The reserved-RE configuration information includes the offset value indication, used to indicate $\Delta_{offset}$. As shown in FIG. 11(b), a symbol 0 is a start symbol set, a reserved RE in the symbol 0 corresponds to a subcarrier m in an RB n, a symbol 2 is a symbol set adjacent to the symbol 0, and a reserved RE in the symbol 2 corresponds to a subcarrier m in an RB n', where $$m' = (m + \Delta_{offset}) \mod 12$$

and $$n' = \begin{cases} n, & m + \Delta_{offset} > 12 \\ n+1, & \text{otherwise} \end{cases},$$

where $$\Delta_{offset} = 2.$$

For example, the resource unit includes two RBs in frequency domain, and includes 14 symbols in time domain, and one RB includes a total of 12 subcarriers: a subcarrier 0 to a subcarrier 11.

The gNB sends reserved-RE configuration signaling to the UE, where the reserved-RE configuration signaling may include one subcarrier set indication and one symbol set indication, to indicate the reserved RE in the resource unit. The subcarrier set indication may indicate that the start subcarrier index is Idx_start and the end subcarrier index is Idx_end. If a numbering scheme corresponding to a subcarrier index may be the first frequency numbering scheme, an RB index included in Idx_start is 0, and a subcarrier index in an RB is 6. If a numbering scheme corresponding to a subcarrier index may be the second frequency numbering scheme, Idx_start is 6. If a numbering scheme corresponding to a subcarrier index may be the first frequency numbering scheme, an RB index included in Idx_end is 1, and a subcarrier index in an RB is 7. If a numbering scheme corresponding to a subcarrier index may be the second frequency numbering scheme, Idx_end is 19. The symbol set indication may indicate the start symbol index and the end symbol index, where a value of the start symbol index is 0, and a value of the end symbol index is 7. Alternatively, the symbol set indication may indicate the start symbol index and the quantity of consecutively allocated symbols, where a value of the start symbol index is 0, and the quantity of consecutively allocated symbols is 8.

The UE receives the reserved-RE configuration signaling, and determines the reserved REs shown in FIG. 10(*a*) in the resource unit based on the signaling. The reserved REs determined by the UE are: REs corresponding to 14 subcarriers starting from the subcarrier 6 in the RB 0 to the subcarrier 7 in the RB 1 in the symbol 0 to the symbol 7 in the resource unit.

For example, the resource unit includes two RBs in frequency domain, and includes 14 symbols in time domain, and one RB includes a total of 12 subcarriers: a subcarrier 0 to a subcarrier 11.

The gNB sends reserved-RE configuration signaling to the UE, where the reserved-RE configuration signaling may include one symbol set index and one subcarrier set indication, to indicate the reserved REs in the resource unit. The symbol set index includes 14 bits, and each bit corresponds to one symbol in the resource unit. Values of a bitmap are 11111111000000. The subcarrier set indication may indicate that the start subcarrier index is Idx_start and indicate the quantity of consecutively allocated subcarriers. If a numbering scheme corresponding to a subcarrier index may be the first frequency numbering scheme, an RB index included in Idx_start is 0, and a subcarrier index in an RB is 6. If a numbering scheme corresponding to a subcarrier index may be the second frequency numbering scheme, Idx_start is 6. The quantity of consecutively allocated subcarriers is 14.

The UE receives the reserved-RE configuration signaling, and determines the reserved REs shown in FIG. 10(*a*) in the resource unit based on the signaling. The reserved REs determined by the UE are: REs corresponding to 14 subcarriers starting from the subcarrier 6 in the RB 0 to the subcarrier 7 in the RB 1 in the symbol 0 to the symbol 7 in the resource unit.

For example, the resource unit includes two RBs in frequency domain, and includes three symbols in time domain, and one RB includes a total of 12 subcarriers: a subcarrier 0 to a subcarrier 11.

The gNB sends reserved-RE configuration signaling to the UE, where the reserved-RE configuration signaling may include one symbol set index and one subcarrier set indication, to indicate the reserved REs in the resource unit. The symbol set indication includes three bits, and each bit corresponds to one symbol in the resource unit. Values of a bitmap are 101. The subcarrier set indication includes 24 bits, and each bit corresponds to one subcarrier in the resource unit. Values of a bitmap are 000111000011100001110000.

The UE receives the reserved-RE configuration signaling, and determines the reserved REs shown in FIG. 10(*b*) in the resource unit based on the signaling. The reserved REs determined by the UE are: REs corresponding to the subcarrier 3 to the subcarrier 5 of the RB 0, the subcarrier 10 and the subcarrier 11 of the RB 0, the subcarrier 0 of the RB 1, and the subcarrier 5 to the subcarrier 7 of the RB 1 in the symbol 0 and the symbol 2 in the resource unit.

For example, the resource unit includes one RB in frequency domain, and includes four symbols in time domain, and one RB includes a total of 12 subcarriers: a subcarrier 0 to a subcarrier 11. The gNB sends reserved-RE configuration signaling to the UE. If the reserved-RE configuration signaling includes one subcarrier set indication, the start carrier index included in the subcarrier set indication is Idx_start, and the quantity of contiguous subcarriers is 6. If a numbering scheme corresponding to a subcarrier index may be the first frequency numbering scheme, an RB index included in Idx_start is 0, and a subcarrier index in an RB is 3. If a numbering scheme corresponding to a subcarrier index may be the second frequency numbering scheme, Idx_start is 3. After receiving the reserved-RE configuration signaling, the UE determines the reserved REs shown in FIG. 10(*c*) in the resource unit. As shown in FIG. 10(*c*), the reserved REs in the symbol 0 to the symbol 3 in the resource unit correspond to same subcarriers, namely, the subcarrier 3 to the subcarrier 8.

For example, the resource unit includes two RBs in frequency domain, and includes three symbols in time domain, and one RB includes a total of 12 subcarriers: a subcarrier 0 to a subcarrier 11. Reserved-RE configuration signaling sent by the gNB to the UE includes: a start subcarrier set indication, a period of a subcarrier set, an offset value indication, a start symbol set indication, and a period of a symbol set.

The start subcarrier index included in the start subcarrier set indication is Idx_start, and the quantity of contiguous subcarriers is 3. If a numbering scheme corresponding to a subcarrier index may be the first frequency numbering scheme, an RB index included in Idx is 0, and a subcarrier index in an RB is 3. If a numbering scheme corresponding to a subcarrier index may be the second frequency numbering scheme, Idx_start is 3.

The period of the subcarrier set is 7, or a distance between two adjacent subcarrier sets that are included is 4.

An offset value indicated by the offset value indication is 2.

The start symbol index included in the start symbol set indication is 0, and the quantity of contiguous symbols is 1.

The period of the symbol set is 2, or a distance between two adjacent symbol sets in which reserved REs are located is 1.

After receiving the reserved-RE configuration signaling, the UE determines the reserved REs shown in FIG. 11(b) in the resource unit. As shown in FIG. 11(b), in the resource unit, the reserved REs are configured in the symbol 0 and the symbol 2. In the symbol 0, subcarriers corresponding to the reserved REs are a subcarrier 3 to a subcarrier 5 of an RB 0, a subcarrier 10 and a subcarrier 11 of the RB 0, a subcarrier 0 of an RB 1, and a subcarrier 5 to a subcarrier 7 of the RB 1. In the symbol 2, subcarriers corresponding to reserved REs are the subcarrier 5 to a subcarrier 7 of the RB 0, the subcarrier 0 to a subcarrier 2 of the RB 1, and the subcarrier 7 to a subcarrier 9 of the RB 1.

In the resource configuration method provided in this embodiment of the present disclosure, the time-frequency resource used for data transmission between the gNB and the UE may be a preconfigured resource, or may be a resource notified by the gNB to the UE in an implicit or explicit manner. For example, the time-frequency resource is a scheduling resource, and the gNB allocates the scheduling resource to the UE by using downlink control information (DCI). The scheduling resource may be one slot in time domain, and may be several RBGs in frequency domain. The gNB and the UE may perform data transmission on the scheduling resource of the UE.

The resource used for data transmission between the gNB and the UE may include a reserved RE, and the reserved RE is not used for the data transmission between the gNB and the UE. This solution may also be described as follows: The gNB and the UE perform data transmission on some or all resources other than the reserved RE in the resource used for the data transmission between the gNB and the UE. To determine an RE used for data transmission, the resource configuration method provided in this embodiment of the present disclosure may further include frequency domain allocation and time domain allocation of the resource unit, to determine an allocated resource unit in the time-frequency resource, thereby determining the reserved resource or the reserved RE in the reserved resource. A granularity of the frequency domain allocation is X RBs, and a granularity of the time domain allocation is Y symbols, where X is a quantity of RBs included in the resource unit in frequency, and Y is a quantity of symbols included in the resource unit in time domain. The time-frequency resource may be a bandwidth part of the UE, a carrier, a virtual carrier, or another resource in frequency domain. This is not limited in the present disclosure. A bandwidth of the virtual carrier may be a maximum carrier bandwidth.

In one embodiment, during the frequency domain allocation of the resource unit, the gNB and the UE may determine a position of the allocated resource unit in the frequency resource by using a preconfigured method.

In one embodiment, during the frequency domain allocation of the resource unit, the gNB sends resource unit frequency allocation information to the UE, to indicate, with a granularity of X RBs, a position that is of the resource unit allocated by the gNB to the UE and that is in frequency domain, or to indicate, with a granularity of a resource unit, a position that is of the resource unit allocated by the gNB to the UE that is in frequency domain. X is the quantity of RBs included in the resource unit in frequency. For example, the resource unit frequency allocation information includes a frequency index of the resource unit allocated by the gNB to the UE. After receiving the resource unit frequency allocation information, the UE determines the reserved RE in the resource unit indicated by the resource unit allocation information, where the reserved RE is included in the reserved resource of the UE. In this embodiment of the present disclosure, the resource unit frequency allocation information is used to indicate the position that is of the resource unit allocated by the gNB to the UE and that is in frequency domain, and may also be referred to as another name. This is not limited in the present disclosure.

In this embodiment of the present disclosure, the frequency resource of the time-frequency resource may be numbered by using a third frequency numbering scheme in frequency domain, to be specific, the frequency resource is numbered with a granularity of a resource unit, and one frequency resource index corresponds to one resource unit in the frequency resource. FIG. 12(a) is an example of a diagram of numbering a frequency resource with a granularity of a resource unit. As shown in FIG. 12(a), the frequency resource includes ten resource units, the ten resource units are a resource unit 0 to a resource unit 9, and one resource unit includes two RBs.

In this embodiment of the present disclosure, the frequency resource of the time-frequency resource may alternatively be numbered by using a fourth frequency numbering scheme in frequency domain. In the frequency resource, an index of a resource unit corresponds to an index of a start RB in the resource unit. FIG. 12(b) is an example of a diagram of numbering a frequency resource by using a fourth frequency numbering scheme. As shown in FIG. 12(b), one resource unit includes two RBs, an index of a resource unit including an RB 3 and an RB 4 is an index of the RB 3, an index of a resource unit including an RB 5 and an RB 6 is an index of the RB 5, and an index of a resource unit including an RB 7 and an RB 8 is an index of the RB 7.

The resource unit frequency allocation information may be any one of the following resource unit frequency allocation information C1 to resource unit frequency allocation information C3:

Resource Unit Frequency Allocation Information C1:

The resource unit frequency allocation information C1 includes P information bits, where P is a positive integer.

When a numbering scheme of resource units is the third frequency numbering scheme, one of the P information bits corresponds to p1 resource units in the frequency resource, where P and p1 are positive integers. For example, P is equal to a total quantity of resource units included in the frequency domain resource, where p1 is equal to 1. For an information bit in the P information bits, if a value of the information bit is t1, a resource unit corresponding to the information bit includes a reserved RE; or if a value of the information bit is not t1 or is t2, a resource unit corresponding to the information bit does not include a reserved RE. t1 and t2 are integers. For example, t1 is equal to 1.

For example, using an example in which p1 is equal to 1, the frequency resource and numbers of the resource units are shown in FIG. 12(a). The frequency resource includes ten resource units, the ten resource units are a resource unit 0 to a resource unit 9, and one resource unit includes two RBs. If values of the P information bits are 0111000000, resource units allocated by the gNB to the UE in the frequency resource are a resource unit 1, a resource unit 2, and a resource unit 3.

When a numbering scheme of resource units is the fourth frequency numbering scheme, one of the P information bits corresponds to a start RB of p1 resource units in the frequency resource, where P and p1 are positive integers. For example, P is equal to a total quantity of RBs included in the frequency domain resource, where p1 is equal to 1. For an information bit in the P information bits, if a value of the information bit is t1, the p1 resource units whose start RB is an RB corresponding to the information bit include a reserved RE; or if a value of the information bit is not t1 or is t2, the p1 resource units whose start RB is an RB corresponding to the information bit do not include a reserved RE. t1 and t2 are integers. For example, t1 is equal to 1.

Figure 12:
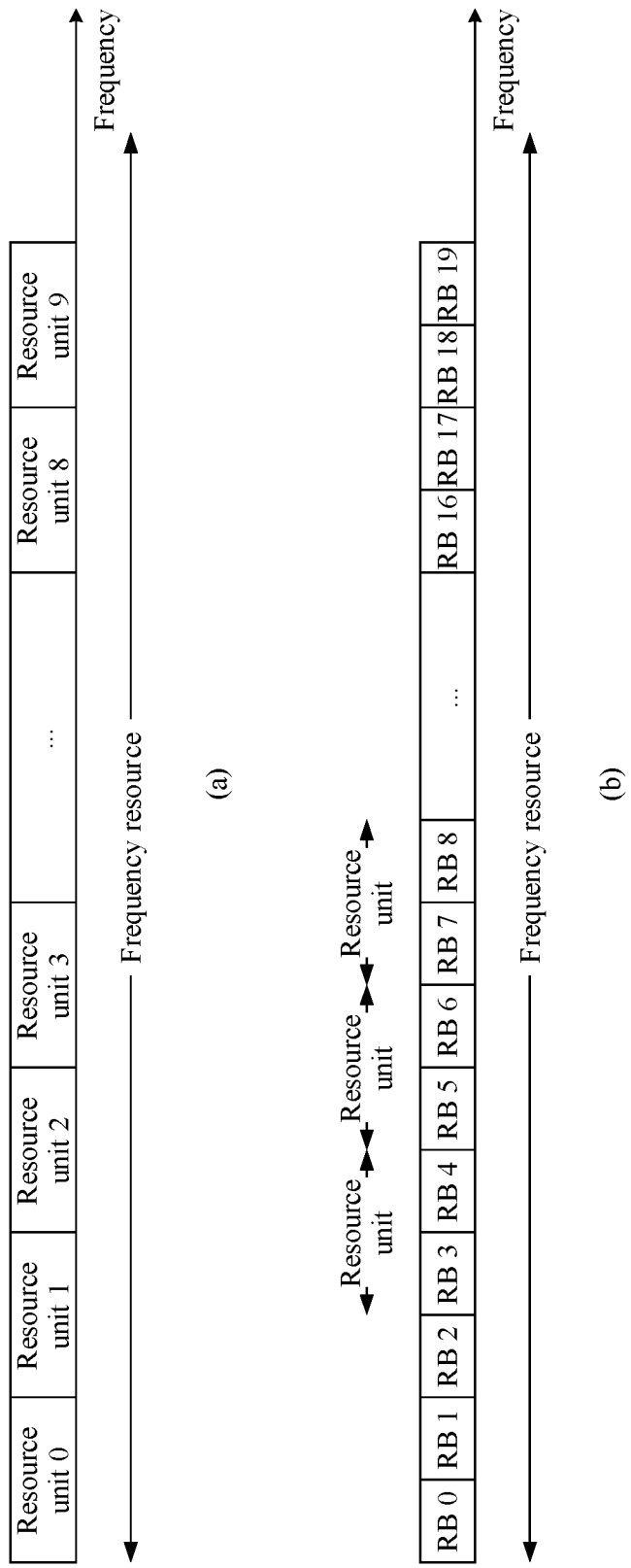
FIG. 12 is an example of a diagram of numbering a frequency resource with a granularity of a resource unit according to an embodiment of the present disclosure.

For example, using an example in which p1 is equal to 1, the frequency resource and numbers of the resource units are shown in FIG. 12(*b*). One resource unit includes two RBs. If values of the P information bits are 00010101000000000, resource units allocated by the gNB to the UE in the frequency resource are a resource unit whose start RB is an RB 3, a resource unit whose start RB is an RB 5, and a resource unit whose start RB is an RB 7.

Resource Unit Frequency Allocation Information C2:

The resource unit frequency allocation information C2 includes Q resource unit frequency set indications, used to indicate Q groups of resource units allocated in frequency domain, where Q is a positive integer. Any one of the Q resource unit frequency set indications may be a first resource unit frequency set indication or a second resource unit frequency set indication.

The first resource unit frequency set indication is used to indicate a start resource unit and a quantity of consecutively allocated resource units in frequency domain, and is used to indicate one group of resource units. A numbering scheme corresponding to the start resource unit may be the third frequency numbering scheme, or may be the fourth frequency numbering scheme. This is not limited in the present disclosure.

The second resource unit frequency set indication is used to indicate a start resource unit and an end resource unit in frequency domain, and is used to indicate one group of resource units. Numbering schemes corresponding to the start resource unit and the end resource unit may be the third frequency numbering scheme, or may be the fourth frequency numbering scheme. This is not limited in the present disclosure.

Resource Unit Frequency Allocation Information C3:

The resource unit frequency allocation information C3 includes a frequency start resource unit set indication and a frequency resource unit set period indication. The frequency start resource unit set indication is used to indicate a start resource unit set allocated in frequency domain, and the frequency start resource unit set indication may be the same as the first resource unit frequency set indication or second resource unit frequency set indication described in the resource unit frequency allocation information C2. The frequency resource unit set period indication is used to indicate a distance between adjacent resource unit sets allocated in frequency domain.

The time-frequency resource may be at least one slot, at least one mini-slot, at least one subframe, at least one system frame, or another resource in time domain. This is not limited in the present disclosure.

In one embodiment, during the time domain allocation of the resource unit, the gNB and the UE may determine a position of the allocated resource unit in the time domain resource by using a preconfigured method.

In one embodiment, during the time domain allocation of the resource unit, the gNB sends time domain resource unit allocation information to the UE, to indicate, with a granularity of Y symbols, a time domain position of the resource unit allocated by the gNB to the UE, or to indicate, with a granularity of a resource unit, a time domain position of the resource unit allocated by the gNB to the UE. Y is the quantity of symbols included in the resource unit in time domain. For example, the resource unit time domain allocation information includes a time domain index of the resource unit allocated by the gNB to the UE. After receiving the resource unit time domain allocation information, the UE determines the allocated resource unit in time domain, and determines the reserved RE in the allocated resource unit. The reserved RE is included in the reserved resource of the UE. In this embodiment of the present disclosure, the resource unit time domain allocation information is used to indicate the time domain position of the resource unit allocated by the gNB to the UE, and may also be referred to as another name. This is not limited in the present disclosure.

Figure 13:
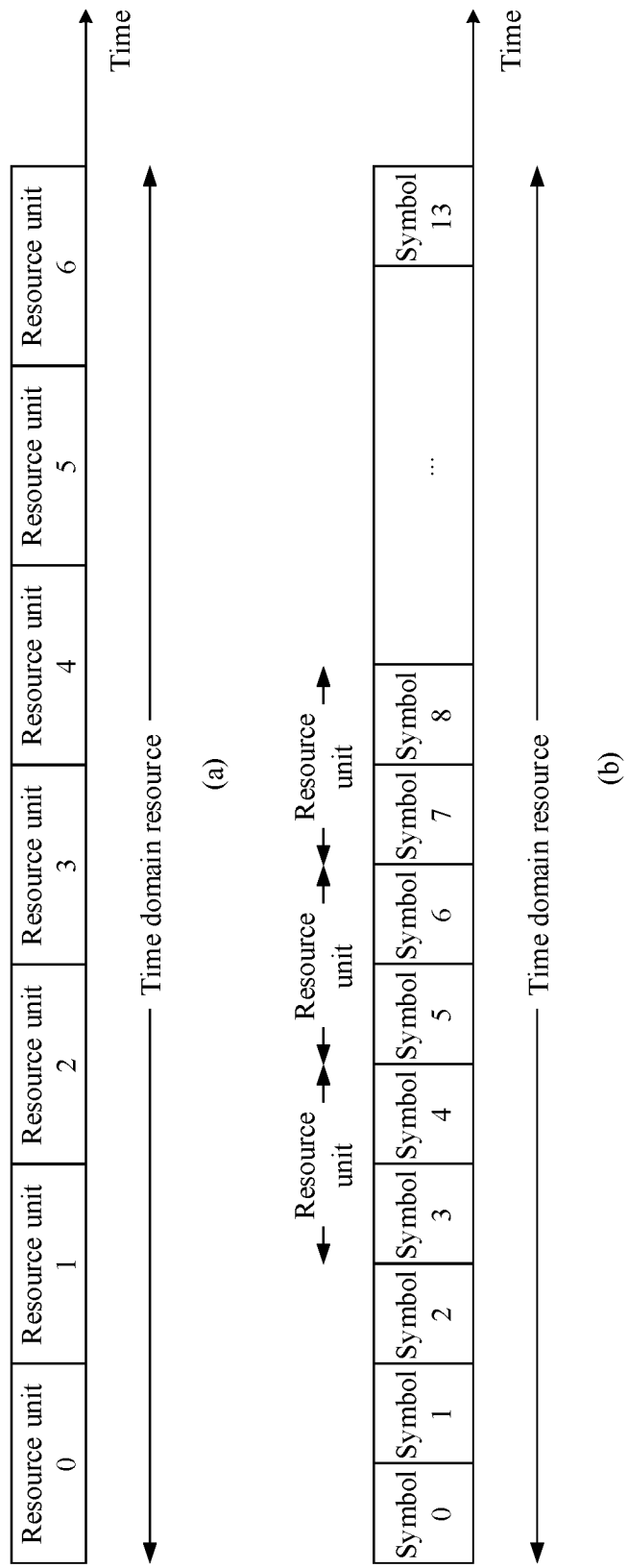
FIG. 13 is an example of a diagram of numbering a time domain resource with a granularity of a resource unit according to an embodiment of the present disclosure.

In this embodiment of the present disclosure, the time domain resource of the time-frequency resource may be numbered by using a first time domain numbering scheme in time domain, to be specific, the time domain resource is numbered with a granularity of a resource unit, and one time domain index corresponds to one resource unit in the time domain resource. FIG. 13(*a*) is an example of a diagram of numbering a time domain resource with a granularity of a resource unit. As shown in FIG. 13(*a*), the time domain resource includes seven resource units, the seven resource units are a resource unit 0 to a resource unit 6, and one resource unit includes two RBs.

In this embodiment of the present disclosure, the time domain resource of the time-frequency resource may alternatively be numbered by using a second time domain numbering scheme in time domain. In the time domain resource, an index of a resource unit corresponds to an index of a start symbol in the resource unit. FIG. 13(*b*) is an example of a diagram of numbering a time domain resource by using a second time domain numbering scheme. As shown in FIG. 13(*b*), the time domain resource includes 14 symbols, one resource unit includes two symbols, an index of a resource unit including a symbol 3 and a symbol 4 is an index of the symbol 3, an index of a resource unit including a symbol 5 and a symbol 6 is an index of the symbol 5, and an index of a resource unit including a symbol 7 and a symbol 8 is an index of the symbol 7.

The resource unit time domain allocation information may be any one of the following resource unit time domain allocation information D1 to resource unit time domain allocation information D3:

Resource Unit Time Domain Allocation Information D1:

The resource unit time domain allocation information D1 includes E information bits.

When a time domain numbering scheme of resource units is the first time domain numbering scheme, one of the E information bits corresponds to e1 resource units in the time domain resource, where E and e1 are positive integers. For example, E is equal to a total quantity of resource units included in the time domain resource, where e1 is equal to 1. For an information bit in the E information bits, if a value of the information bit is t1, a resource unit corresponding to the information bit includes a reserved RE; or if a value of the information bit is not t1 or is t2, a resource unit corresponding to the information bit does not include a reserved RE. t1 and t2 are integers. For example, t1 is equal to 1.

For example, using an example in which e1 is equal to 1, the time domain resource and numbers of the resource units are shown in FIG. 13(a). The time domain resource includes seven resource units, the seven resource units are a resource unit 0 to a resource unit 6, and one resource unit includes two symbols. If values of the E information bits are 0111000, resource units allocated by the gNB to the UE in the time domain resource are a resource unit 1, a resource unit 2, and a resource unit 3.

When a time domain numbering scheme of resource units is the second time domain numbering scheme, one of the E information bits corresponds to a start symbol of e1 resource units in the time domain resource, where E and e1 are positive integers. For example, E is equal to a total quantity of symbols included in the frequency domain resource, where e1 is equal to 1. For an information bit in the E information bits, if a value of the information bit is t1, the e1 resource units whose start RB is an RB corresponding to the information bit include a reserved RE; or if a value of the information bit is not t1 or is t2, the e1 resource units whose start RB is an RB corresponding to the information bit do not include a reserved RE. t1 and t2 are integers. For example, t1 is equal to 1.

For example, using an example in which e1 is equal to 1, the time domain resource and numbers of the resource units are shown in FIG. 13(b). One resource unit includes two symbols in time domain. If values of the E information bits are 00010101000000, resource units allocated by the gNB to the UE in time domain are a resource unit whose start symbol is a symbol 3, a resource unit whose start symbol is a symbol 5, and a resource unit whose start symbol is a symbol 7.

Resource Unit Time Domain Allocation Information D2:

The unit time domain allocation information D2 includes R resource unit time domain set indications, used to indicate R groups of resource units allocated in time domain, where R is a positive integer. Any one of the R resource unit time domain set indications may be the following first resource unit time domain set indication or second resource unit time domain set indication.

The first resource unit time domain set indication is used to indicate a time domain start resource unit and a quantity of consecutively allocated resource units. One first resource unit time domain set indication is used to indicate one group of resource units in time domain. A numbering scheme corresponding to the time domain start resource unit may be the first time domain numbering scheme, or may be the second time domain numbering scheme. This is not limited in the present disclosure.

The second resource unit time domain set indication is used to indicate a time domain start resource unit and a time domain end resource unit. One second resource unit time domain set indication is used to indicate one group of resource units in time domain.

For example, the second resource unit time domain set indication includes an index of the time domain start resource unit and an index of the time domain end resource unit. A numbering scheme corresponding to the time domain start resource unit may be the first time domain numbering scheme, or may be the second time domain numbering scheme. This is not limited in the present disclosure. A numbering scheme corresponding to the time domain end resource unit may be the first time domain numbering scheme, or may be the second time domain numbering scheme. This is not limited in the present disclosure.

Resource Unit Time Domain Allocation Information D3:

The resource unit time domain allocation information D3 includes a time domain start resource unit set indication and a time domain resource unit set period indication. The time domain start resource unit set indication is used to indicate an allocated time domain start resource unit set, and the time domain start resource unit set indication may be the same as the first resource unit time domain set indication or second resource unit time domain set indication described in the resource unit time domain allocation information D2. The time domain resource unit set period indication is used to indicate a distance between adjacent resource unit sets that are allocated in time domain.

In the foregoing embodiments provided in the present disclosure, the method provided in the embodiments of the present disclosure is described from the perspective of the gNB, the UE, and interaction between the gNB and the UE. To implement the functions in the method provided in the embodiments of the present disclosure, both the gNB and the UE may include a hardware structure and/or a software module, to implement the functions in a form of the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

Figure 14:
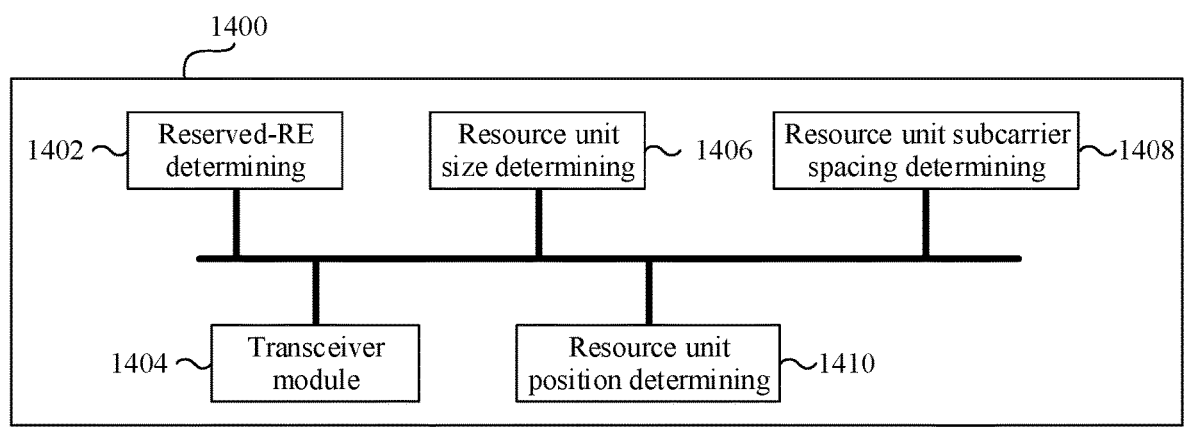
FIG. 14 is a schematic structural diagram of an apparatus according to an embodiment of the present disclosure.

FIG. 14 is a schematic structural diagram of an apparatus 1400 according to an embodiment of the present disclosure. The apparatus 1400 may be a hardware structure, a software module, or a combination of a hardware structure and a software module. The apparatus 1400 may be a UE, and can implement functions of the UE in the method provided in the embodiments of the present disclosure. Alternatively, the apparatus 1400 may be an apparatus that can support a UE in implementing functions of the UE in the method provided in the embodiments of the present disclosure. For example, the apparatus 1400 may be an apparatus disposed in the UE, and can support the UE in implementing the functions of the UE in the method provided in the embodiments of the present disclosure. The apparatus 1400 may be implemented by a chip system. In this embodiment of the present disclosure, the chip system may include a chip, or may include a chip and another discrete component.

As shown in FIG. 14, the apparatus 1400 includes a reserved-RE determining module 1402 and a transceiver module 1404.

The reserved-RE determining module 1402 is configured to determine a reserved RE in a resource unit, where the reserved RE is included in a reserved resource. The resource unit includes X RBs in frequency domain, and includes Y symbols in time domain, where X and Y are positive integers. A method for determining the reserved RE in the resource unit by the reserved-RE determining module 1402 is described in the method provided in the embodiments of the present disclosure, and details are not described herein again.

The transceiver module 1404 is a communications interface between the apparatus 1400 and an external apparatus. The external apparatus may be a circuit, a component, or another apparatus. For example, the transceiver module 1404 may be configured to perform data transmission with a gNB on all or some REs other than the reserved resource. The transceiver module 1404 may further be configured to receive resource unit size configuration signaling, where the resource unit size configuration signaling is used to indicate at least one of a quantity X of RBs included in the resource unit and a quantity Y of symbols included in the resource unit. The transceiver module 1404 may further be configured to receive resource unit subcarrier spacing configuration signaling, where the resource unit subcarrier spacing configuration signaling is used to indicate a subcarrier spacing corresponding to the resource unit. The transceiver module 1404 may further be configured to receive reserved-RE configuration information, where the reserved-RE configuration information is used to indicate the reserved RE in the resource unit. The transceiver module 1404 may further be configured to receive resource unit frequency allocation information and/or resource unit time domain allocation information, to determine a position of an allocated resource unit in a time-frequency resource, thereby determining the reserved resource or the reserved RE in the reserved resource. Descriptions of the signaling received by the transceiver module 1404 are the same as the descriptions in the method provided in the embodiments of the present disclosure, and details are not described herein again.

The apparatus 1400 may further include a resource unit size determining module 1406. The resource unit size determining module 1406 is configured to determine the quantity X of RBs included in the resource unit and the quantity Y of symbols included in the resource unit. A method for determining X and Y by the resource unit size determining module is the same as that described in the method provided in the embodiments of the present disclosure. Details are not described herein again.

The apparatus 1400 may further include a resource unit subcarrier spacing determining module 1408, configured to determine a subcarrier spacing corresponding to the resource unit. A method for determining the subcarrier spacing corresponding to the resource unit by the resource unit subcarrier spacing determining module is the same as that described in the method provided in the embodiments of the present disclosure. Details are not described herein again.

The apparatus 1400 may further include a resource unit position determining module 1410, configured to determine the position of the allocated resource unit in the time-frequency resource. The determining method is the same as that described in the method provided in the embodiments of the present disclosure. Details are not described herein again.

As shown in FIG. 14, the modules in the apparatus 1400 may be coupled. Couplings in this embodiment of the present disclosure are indirect couplings or communication connections between apparatuses, units, or modules, may be implemented in electrical, mechanical, or another form, and are used for information exchange between the apparatuses, the units, or the modules.

Figure 15:
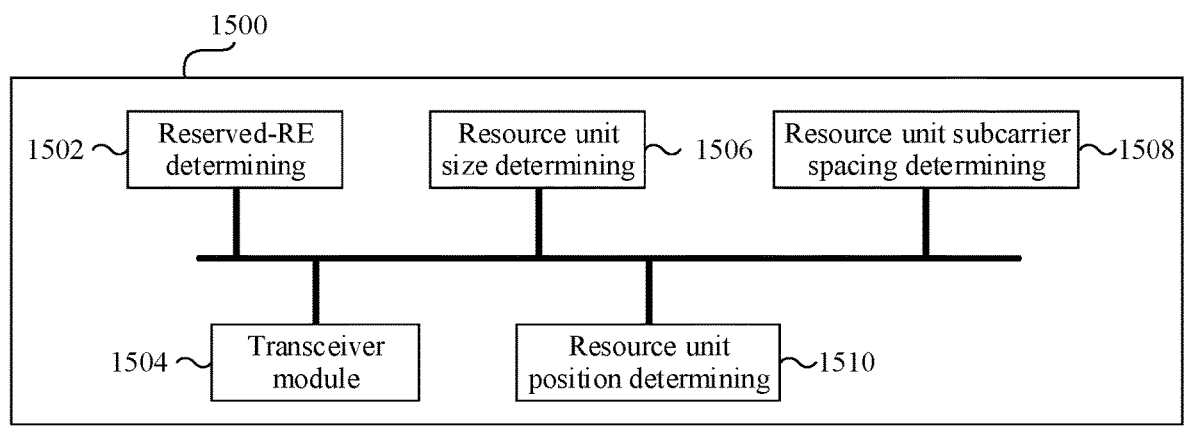
FIG. 15 is a schematic structural diagram of an apparatus according to an embodiment of the present disclosure.

FIG. 15 is a schematic structural diagram of an apparatus 1500 according to an embodiment of the present disclosure. The apparatus 1500 may be a hardware structure, a software module, or a combination of a hardware structure and a software module. The apparatus 1500 may be a gNB, and can implement functions of the gNB in the method provided in the embodiments of the present disclosure. Alternatively, the apparatus 1500 may be an apparatus that can support a gNB in implementing functions of the gNB in the method provided in the embodiments of the present disclosure. For example, the apparatus 1500 may be an apparatus disposed in the gNB, and can support the gNB in implementing the functions of the gNB in the method provided in the embodiments of the present disclosure. The apparatus 1500 may be implemented by a chip system.

As shown in FIG. 15, the apparatus 1500 includes a reserved-RE determining module 1502 and a transceiver module 1504.

The reserved-RE determining module 1502 is configured to determine a reserved RE in a resource unit, where the reserved RE is included in a reserved resource. The resource unit includes X RBs in frequency domain, and includes Y symbols in time domain, where X and Y are positive integers. A method for determining the reserved RE in the resource unit by the reserved-RE determining module 1502 is described in the method provided in the embodiments of the present disclosure, and details are not described herein again.

The transceiver module 1504 is a communications interface between the apparatus 1500 and an external apparatus. The external apparatus may be a circuit, a component, or another apparatus. For example, the transceiver module 1504 may be configured to perform data transmission with UE on all or some REs other than the reserved resource. The transceiver module 1504 may further be configured to send resource unit size configuration signaling, where the resource unit size configuration signaling is used to indicate at least one of a quantity X of RBs included in the resource unit and a quantity Y of symbols included in the resource unit. The transceiver module 1504 may further be configured to send resource unit subcarrier spacing configuration signaling, where the resource unit subcarrier spacing configuration signaling is used to indicate a subcarrier spacing corresponding to the resource unit. The transceiver module 1504 may further be configured to send reserved-RE configuration information, where the reserved-RE configuration information is used to indicate the reserved RE in the resource unit. The transceiver module 1504 may further be configured to send resource unit frequency allocation information and/or resource unit time domain allocation information, so that the UE determines a position of an allocated resource unit in a time-frequency resource, and determines the reserved resource or the reserved RE in the reserved resource. Descriptions of the signaling sent by the transceiver module 1504 are the same as the descriptions in the method provided in the embodiments of the present disclosure, and details are not described herein again.

The apparatus 1500 may further include a resource unit size determining module 1506. The resource unit size determining module 1506 is configured to determine the quantity X of RBs included in the resource unit and the quantity Y of symbols included in the resource unit. A method for determining X and Y by the resource unit size determining module is the same as that described in the method provided in the embodiments of the present disclosure. Details are not described herein again.

The apparatus 1500 may further include a resource unit subcarrier spacing determining module 1508, configured to determine a subcarrier spacing corresponding to the resource unit. A method for determining the subcarrier spacing corresponding to the resource unit by the resource unit subcarrier spacing determining module is the same as that described in the method provided in the embodiments of the present disclosure. Details are not described herein again.

The apparatus 1500 may further include a resource unit position determining module 1510, configured to determine a position of the allocated resource unit in a frequency resource, and determine a position of the allocated resource unit in a time domain resource. The determining method is the same as that described in the method provided in the embodiments of the present disclosure. Details are not described herein again.

As shown in FIG. 15, the modules in the apparatus 1500 may be coupled. Couplings in this embodiment of the present disclosure are indirect couplings or communication connections between apparatuses, units, or modules, may be implemented in electrical, mechanical, or another form, and are used for information exchange between the apparatuses, the units, or the modules.

Figure 16:
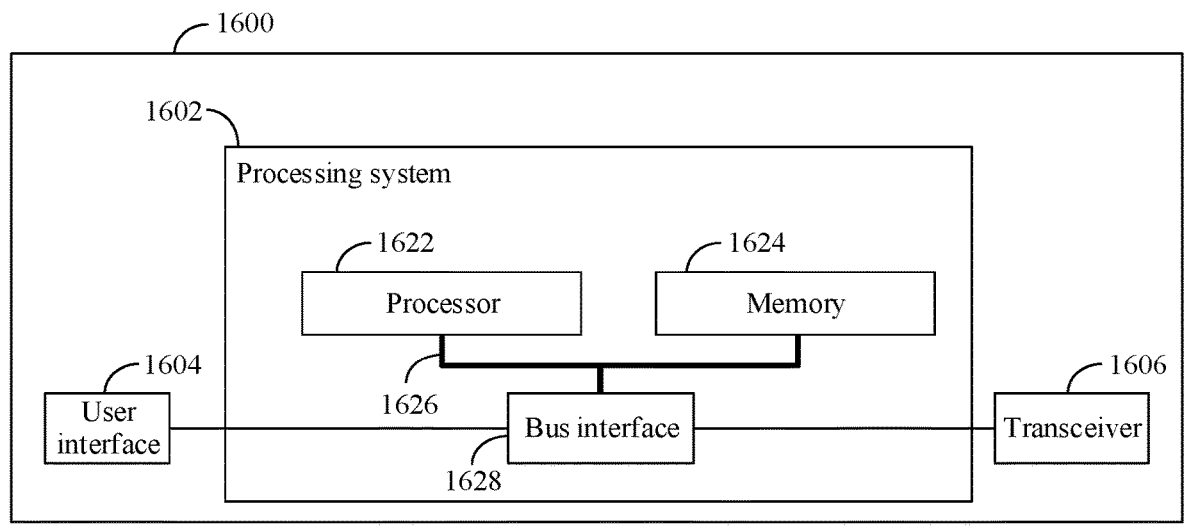
FIG. 16 is a schematic structural diagram of an apparatus according to an embodiment of the present disclosure.

FIG. 16 is a schematic structural diagram of an apparatus 1600 according to an embodiment of the present disclosure. The apparatus 1600 may be a UE, and can implement functions of the UE in the method provided in the embodiments of the present disclosure. Alternatively, the apparatus 1600 may be an apparatus that can support a UE in implementing functions of the UE in the method provided in the embodiments of the present disclosure. For example, the apparatus 1600 may be an apparatus disposed in the UE, and can support the UE in implementing the functions of the UE in the method provided in the embodiments of the present disclosure.

As shown in FIG. 16, the apparatus 1600 includes a processing system 1602, configured to implement or support the UE in implementing the functions of the UE in the method provided in the embodiments of the present disclosure. The processing system 1602 may be a circuit, and the circuit may be implemented by a chip system. The processing system 1602 includes at least one processor 1622 that can be configured to implement or support the UE in implementing the functions of the UE in the method provided in the embodiments of the present disclosure. When the processing system 1602 includes another apparatus in addition to the processor, the processor 1622 may further be configured to manage the another apparatus in the processing system 1602. For example, the another apparatus may be at least one of the following memory 1624, bus 1626, and bus interface 1628. In this embodiment of the present disclosure, the processor may be a central processing unit (CPU), a general-purpose processor, a network processor (NP), a digital signal processor (DSP), a microprocessor, a microcontroller, a programmable logic device (PLD), or any combination thereof.

The processing system 1602 may further include the memory 1624, configured to store a program instruction and/or data. In this embodiment of the present disclosure, the program instruction may also be referred to as an instruction. If the processing system 1602 includes the memory 1624, the processor 1622 may be coupled to the memory 1624. In this embodiment of the present disclosure, the memory includes a volatile memory, for example, a random-access memory (RAM). Alternatively, the memory may include a non-volatile memory, for example, a flash memory, a hard disk drive (HDD), or a solid state drive (SSD). Alternatively, the memory may include a combination of the foregoing types of memories.

The processor 1622 may cooperatively operate with the memory 1624. The processor 1622 may execute the instruction stored in the memory 1624. When executing the instruction stored in the memory 1624, the processor 1622 may implement or support the UE in implementing the functions of the UE in the method provided in the embodiments of the present disclosure. The processor 1622 may further read the data stored in the memory 1624. The memory 1624 may further store data that is obtained when the processor 1622 executes the program instruction.

The processor 1622 may be configured to determine a reserved RE in a resource unit, where the reserved RE is included in a reserved resource. The resource unit includes X RBs in frequency domain, and includes Y symbols in time domain, where X and Y are positive integers. A method for determining the reserved RE is described in the method provided in the embodiments of the present disclosure, and may be the first method for determining a reserved RE or the second method for determining a reserved RE, and details are not described herein again.

The processor 1622 may further be configured to perform data transmission with a gNB on all or some REs other than the reserved resource.

The processor 1622 may further be configured to receive and process resource unit size configuration signaling, where the resource unit size configuration signaling is used to indicate at least one of a quantity X of RBs included in the resource unit and a quantity Y of symbols included in the resource unit. The processor 1622 may further be configured to determine, based on the resource unit size configuration signaling, at least one of the quantity X of RBs included in the resource unit and the quantity Y of symbols included in the resource unit.

The processor 1622 may further be configured to receive and process resource unit subcarrier spacing configuration signaling, where the resource unit subcarrier spacing configuration signaling is used to indicate a subcarrier spacing corresponding to the resource unit. The processor 1622 may further be configured to determine, based on the resource unit subcarrier spacing configuration signaling, the subcarrier spacing corresponding to the resource unit.

The processor 1622 may further be configured to receive and process reserved-RE configuration information, where the reserved-RE configuration information is used to indicate the reserved RE in the resource unit. The processor 1622 may further be configured to determine the reserved RE in the resource unit based on the reserved-RE configuration information.

The processor 1622 may further be configured to receive and process resource unit frequency allocation information and/or resource unit time domain allocation information, to determine a position of an allocated resource unit in a time-frequency resource, thereby determining the reserved resource or the reserved RE in the reserved resource. The processor 1622 may further be configured to determine a position of the allocated resource unit in a frequency resource based on the resource unit frequency allocation information. The processor 1622 may further be configured to determine a position of the allocated resource unit in a time domain resource based on the resource unit time domain allocation information.

The processing system 1602 may further include the bus interface 1628, configured to provide an interface between the bus 1626 and another apparatus.

The apparatus 1600 may further include a transceiver 1606, configured to communicate with another communications device through a transmission medium, so that another apparatus in the apparatus 1600 may communicate with the another communications device. The another apparatus may be the processing system 1602. For example, the another apparatus in the apparatus 1600 may communicate with the another communications device by using the transceiver 1606, and receive and/or send corresponding information. It may also be described as that, the another apparatus in the apparatus 1600 may receive corresponding information, where the corresponding information is received by the transceiver 1606 through the transmission medium, and the corresponding information may be exchanged between the transceiver 1606 and the another apparatus in the apparatus 1600 by using the bus interface 1628 or by using the bus interface 1628 and the bus 1626; and/or, the another apparatus in the apparatus 1600 may send corresponding information, where the corresponding information is sent by the transceiver 1606 through the transmission medium, and the corresponding information may be exchanged between the transceiver 1606 and the another apparatus in the apparatus 1600 by using the bus interface 1628 or by using the bus interface 1628 and the bus 1626.

The apparatus 1600 may further include a user interface 1604. The user interface 1604 is an interface between a user and the apparatus 1600, and may be used for information exchange between the user and the apparatus 1600. For example, the user interface 1604 may be at least one of a keyboard, a mouse, a display, a speaker, a microphone, and a joystick.

The foregoing mainly describes, from the perspective of the apparatus 1600, an apparatus structure provided in the embodiments of the present disclosure. In the apparatus, the processing system 1602 includes the processor 1622, and may further include at least one of the memory 1624, the bus 1626, and the bus interface 1628, to implement the method provided in the embodiments of the present disclosure. The processing system 1602 also falls within the protection scope of the present disclosure.

Figure 17:
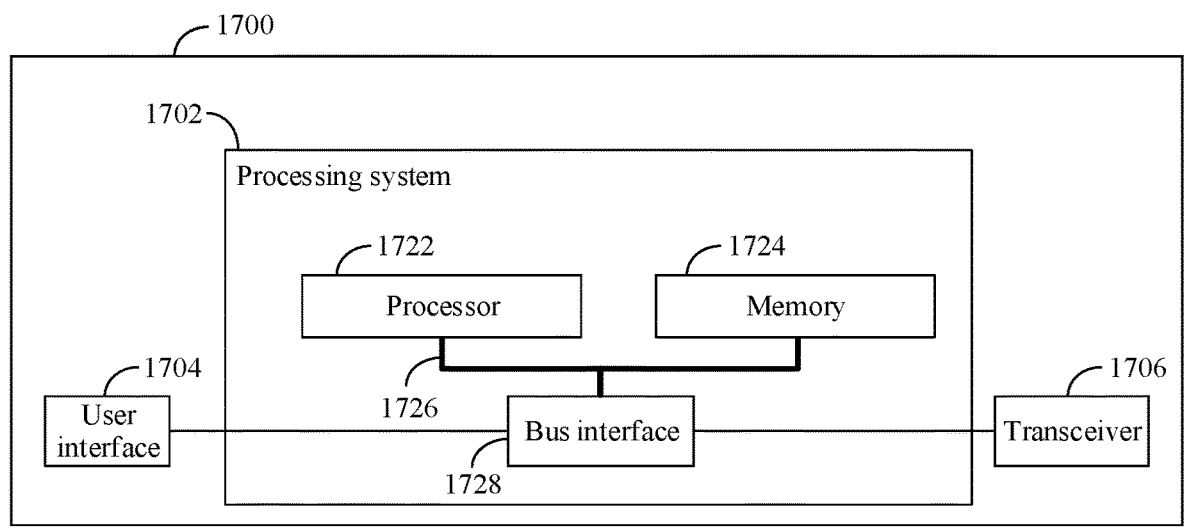
FIG. 17 is a schematic structural diagram of an apparatus according to an embodiment of the present disclosure.

FIG. 17 is a schematic structural diagram of an apparatus 1700 according to an embodiment of the present disclosure. The apparatus 1700 may be a gNB, and can implement functions of the gNB in the method provided in the embodiments of the present disclosure. Alternatively, the apparatus 1700 may be an apparatus that can support a gNB in implementing functions of the gNB in the method provided in the embodiments of the present disclosure. For example, the apparatus 1700 may be an apparatus disposed in the gNB, and can support the gNB in implementing the functions of the gNB in the method provided in the embodiments of the present disclosure.

As shown in FIG. 17, the apparatus 1700 includes a processing system 1702, configured to implement or support the gNB in implementing the functions of the gNB in the method provided in the embodiments of the present disclosure. The processing system 1702 may be a circuit, and the circuit may be implemented by a chip system. The processing system 1702 includes at least one processing system 1722 that can be configured to implement or support the gNB in implementing the functions of the gNB in the method provided in the embodiments of the present disclosure. When the processing system 1702 includes another apparatus in addition to the processor, the processor 1722 may further be configured to manage the another apparatus in the processing system 1702. For example, the another apparatus may be at least one of the following memory 1724, bus 1726, and bus interface 1728.

The processing system 1702 may further include the memory 1724, configured to store a program instruction and/or data. If the processing system 1702 includes the memory 1724, the processor 1722 may be coupled to the memory 1724.

The processor 1722 may cooperatively operate with the memory 1724. The processor 1722 may execute the instruction stored in the memory 1724. When executing the instruction stored in the memory 1724, the processor 1722 may implement or support the gNB in implementing the functions of the gNB in the method provided in the embodiments of the present disclosure. The processor 1722 may further read the data stored in the memory 1724. The memory 1724 may further store data that is obtained when the processor 1722 executes the program instruction.

The processor 1722 may be configured to determine a reserved RE in a resource unit, where the reserved RE is included in a reserved resource. The resource unit includes X RBs in frequency domain, and includes Y symbols in time domain, where X and Y are positive integers. A method for determining the reserved RE is described in the method provided in the embodiments of the present disclosure, and details are not described herein again.

The processor 1722 may further be configured to perform data transmission with UE on all or some REs other than the reserved resource.

The processor 1722 may further be configured to generate and send resource unit size configuration signaling, where the resource unit size configuration signaling is used to indicate at least one of a quantity X of RBs included in the resource unit and a quantity Y of symbols included in the resource unit.

The processor 1722 may further be configured to generate and send resource unit subcarrier spacing configuration signaling, where the resource unit subcarrier spacing configuration signaling is used to indicate a subcarrier spacing corresponding to the resource unit.

The processor 1722 may further be configured to generate and send reserved-RE configuration information, where the reserved-RE configuration information is used to indicate the reserved RE in the resource unit.

The processor 1722 may further be configured to generate and send resource unit frequency allocation information and/or resource unit time domain allocation information, to determine a position of an allocated resource unit in a time-frequency resource, thereby determining the reserved resource or the reserved RE in the reserved resource.

The processing system 1702 may further include the bus interface 1728, configured to provide an interface between the bus 1726 and another apparatus.

The apparatus 1700 may further include a transceiver 1706, configured to communicate with another communications device through a transmission medium, so that another apparatus in the apparatus 1700 may communicate with the another communications device. The another apparatus may be the processing system 1702. For example, the another apparatus in the apparatus 1700 may communicate with the another communications device by using the transceiver 1706, and receive and/or send corresponding information. It may also be described as that, the another apparatus in the apparatus 1700 may receive corresponding information, where the corresponding information is received by the transceiver 1706 through the transmission medium, and the corresponding information may be exchanged between the transceiver 1706 and the another apparatus in the apparatus 1700 by using the bus interface 1728 or by using the bus interface 1728 and the bus 1726; and/or, the another apparatus in the apparatus 1700 may send corresponding information, where the corresponding information is sent by the transceiver 1706 through the transmission medium, and the corresponding information may be exchanged between the transceiver 1706 and the another apparatus in the apparatus 1600 by using the bus interface 1728 or by using the bus interface 1728 and the bus 1726.

The apparatus 1700 may further include a user interface 1704. The user interface 1704 is an interface between a user and the apparatus 1700, and may be used for information exchange between the user and the apparatus 1700. For example, the user interface 1704 may be at least one of a keyboard, a mouse, a display, a speaker, a microphone, and a joystick.

The foregoing mainly describes, from the perspective of the apparatus 1700, an apparatus structure provided in the embodiments of the present disclosure. In the apparatus, the processing system 1702 includes the processor 1722, and may further include at least one of the memory 1724, the bus 1726, and the bus interface 1728, to implement the method provided in the embodiments of the present disclosure. The processing system 1702 also falls within the protection scope of the present disclosure.

In the apparatus embodiments of the present disclosure, module division of an apparatus is logical function division and may be another division in an actual implementation. For example, all function modules of the apparatus may be integrated into one module, or may be independent of each other; or two or more function modules may be integrated into one module.

All or some of the methods provided in the embodiments of the present disclosure may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions of the present disclosure, but not to limit the protection scope of the present disclosure. Modification, equivalent replacement, improvement, and the like made without departing from the basic of the technical solutions of the present disclosure shall fall within the protection scope of the present disclosure.

What is claimed is:

1. A resource configuration method, comprising:
   determining a reserved resource element (RE) in y1 symbols in a resource unit based on a reserved-RE pattern, wherein the reserved RE is comprised in a reserved resource, the resource unit comprises X resource blocks (RBs) in frequency domain, and the resource unit comprises Y symbols in time domain, wherein X and Y are positive integers, Y is greater than 1 when X is equal to 1, and X is greater than 1 when Y is equal to 1, wherein when y1 is greater than 1, in the y1 symbols reserved REs in different symbols correspond to a same subcarrier; and
   receiving data on all or some REs other than the reserved resource.

2. The resource configuration method according to claim 1, further comprising:
   receiving resource unit size configuration signaling, wherein the resource unit size configuration signaling is used to indicate at least one of X and Y.

3. The resource configuration method according to claim 1,
   wherein y1 is an integer greater than or equal to 1 and less than or equal to Y.

4. The resource configuration method according to claim 3, wherein when y1 is greater than 1,
   in the y1 symbols, reserved REs in at least two symbols correspond to different subcarriers.

5. The resource configuration method according to claim 1, wherein the reserved-RE pattern is comprised in M available reserved-RE patterns; and
   the method further comprises:
   receiving a reference signal indication, wherein the M available reserved-RE patterns are some or all of reference signal patterns corresponding to the reference signal indication.

6. The resource configuration method according to claim 1, wherein the method further comprises: receiving reserved-RE configuration information, wherein the reserved-RE configuration information is used to indicate the reserved RE configured in the resource unit.

7. The resource configuration method according to claim 1, further comprising:
   receiving resource unit frequency allocation information, wherein the resource unit frequency allocation information is used to determine an allocated resource unit in a frequency resource with a granularity of X RBs; and
   receiving resource unit time domain allocation information, wherein the resource unit time domain allocation information is used to determine an allocated resource unit in a time domain resource with a granularity of Y symbols.

8. The resource configuration method according to claim 1, wherein a subcarrier spacing corresponding to the resource unit is a minimum subcarrier spacing supported by a current frequency band, or a subcarrier spacing corresponding to the resource unit is a subcarrier spacing used to transmit a system message.

9. The resource configuration method according to claim 1, further comprising:
   receiving resource unit subcarrier spacing configuration signaling, wherein the resource unit subcarrier spacing configuration signaling is used to indicate a subcarrier spacing corresponding to the resource unit.

10. A resource configuration method, comprising:
    determining a reserved resource element (RE) in y1 symbols in a resource unit based on a reserved-RE pattern, wherein the reserved RE is comprised in a reserved resource, the resource unit comprises X resource blocks (RBs) in frequency domain, and the resource unit comprises Y symbols in time domain, wherein X and Y are positive integers, Y is greater than 1 when X is equal to 1, and X is greater than 1 when Y is equal to 1, wherein when y1 is greater than 1, in the y1 symbols reserved REs in different symbols correspond to a same subcarrier; and sending data on all or some REs other than the reserved resource.

11. The resource configuration method according to claim 10, further comprising:
sending resource unit size configuration signaling, wherein the resource unit size configuration signaling is used to indicate at least one of X and Y.

12. The resource configuration method according to claim 10,
wherein y1 is an integer greater than or equal to 1 and less than or equal to Y.

13. The resource configuration method according to claim 12, wherein when y1 is greater than 1,
in the y1 symbols, reserved REs in at least two symbols correspond to different sub carriers.

14. The resource configuration method according to claim 10, wherein the reserved-RE pattern is comprised in M available reserved-RE patterns; and
the method further comprises:
sending a reference signal indication, wherein the M available reserved-RE patterns are some or all of reference signal patterns corresponding to the reference signal indication.

15. The resource configuration method according to claim 10, wherein the method further comprises: sending reserved-RE configuration information, wherein the reserved-RE configuration information is used to indicate the reserved RE configured in the resource unit.

16. The resource configuration method according to claim 10, further comprising:
sending resource unit frequency allocation information, wherein the resource unit frequency allocation information is used to determine an allocated resource unit in a frequency resource with a granularity of X RBs; and
sending resource unit time domain allocation information, wherein the resource unit time domain allocation information is used to determine an allocated resource unit in a time domain resource with a granularity of Y symbols.

17. The resource configuration method according to claim 10, wherein a subcarrier spacing corresponding to the resource unit is a minimum subcarrier spacing supported by a current frequency band, or a subcarrier spacing corresponding to the resource unit is a subcarrier spacing used to transmit a system message.

18. The resource configuration method according to claim 10, further comprising:
sending resource unit subcarrier spacing configuration signaling, wherein the resource unit subcarrier spacing configuration signaling is used to indicate a subcarrier spacing corresponding to the resource unit.

19. A communications apparatus, comprising a processor and a memory, wherein the memory is configured to store an instruction executed by the processor, and the processor is configured to:
determine a reserved resource element (RE) in y1 symbols in a resource unit based on a reserved-RE pattern, wherein the reserved RE is comprised in a reserved resource, the resource unit comprises X resource blocks (RBs) in frequency domain, and the resource unit comprises Y symbols in time domain, wherein X and Y are positive integers, Y is greater than 1 when X is equal to 1, and X is greater than 1 when Y is equal to 1, wherein when y1 is greater than 1, in the y1 symbols reserved REs in different symbols correspond to a same subcarrier; and
receive data on all or some REs other than the reserved resource.

* * * * *